Aug. 16, 1960  W. F. HUCK ET AL  2,949,300
AUTOMATIC PINSETTERS
Filed Nov. 25, 1955  14 Sheets-Sheet 6
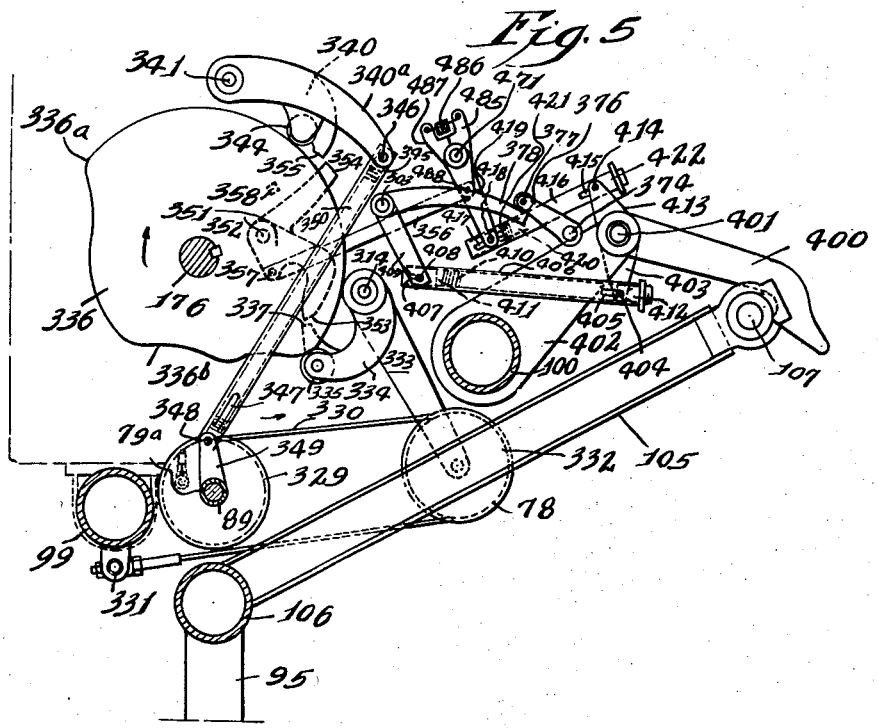
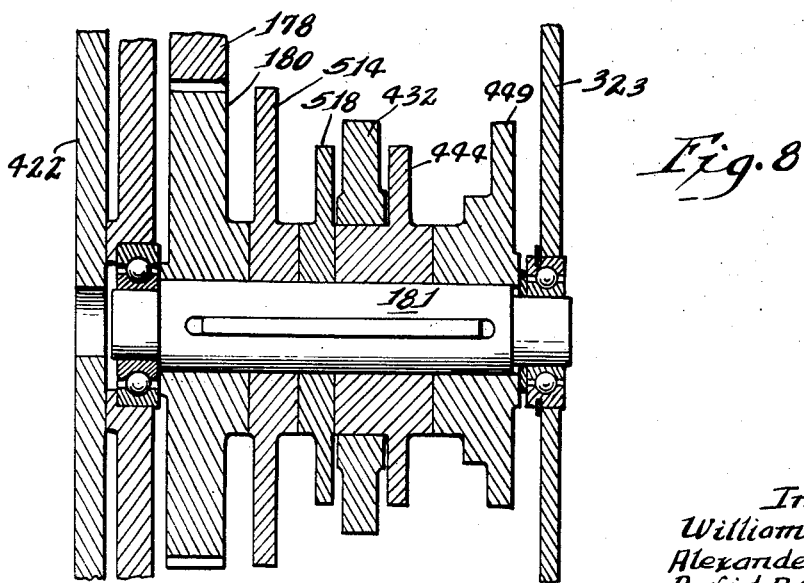
Inventors
William F. Huck
Alexander J. Albrecht
David P. Sanford
By Schroeder, Hofgren, Brady & Wegner
Attorneys

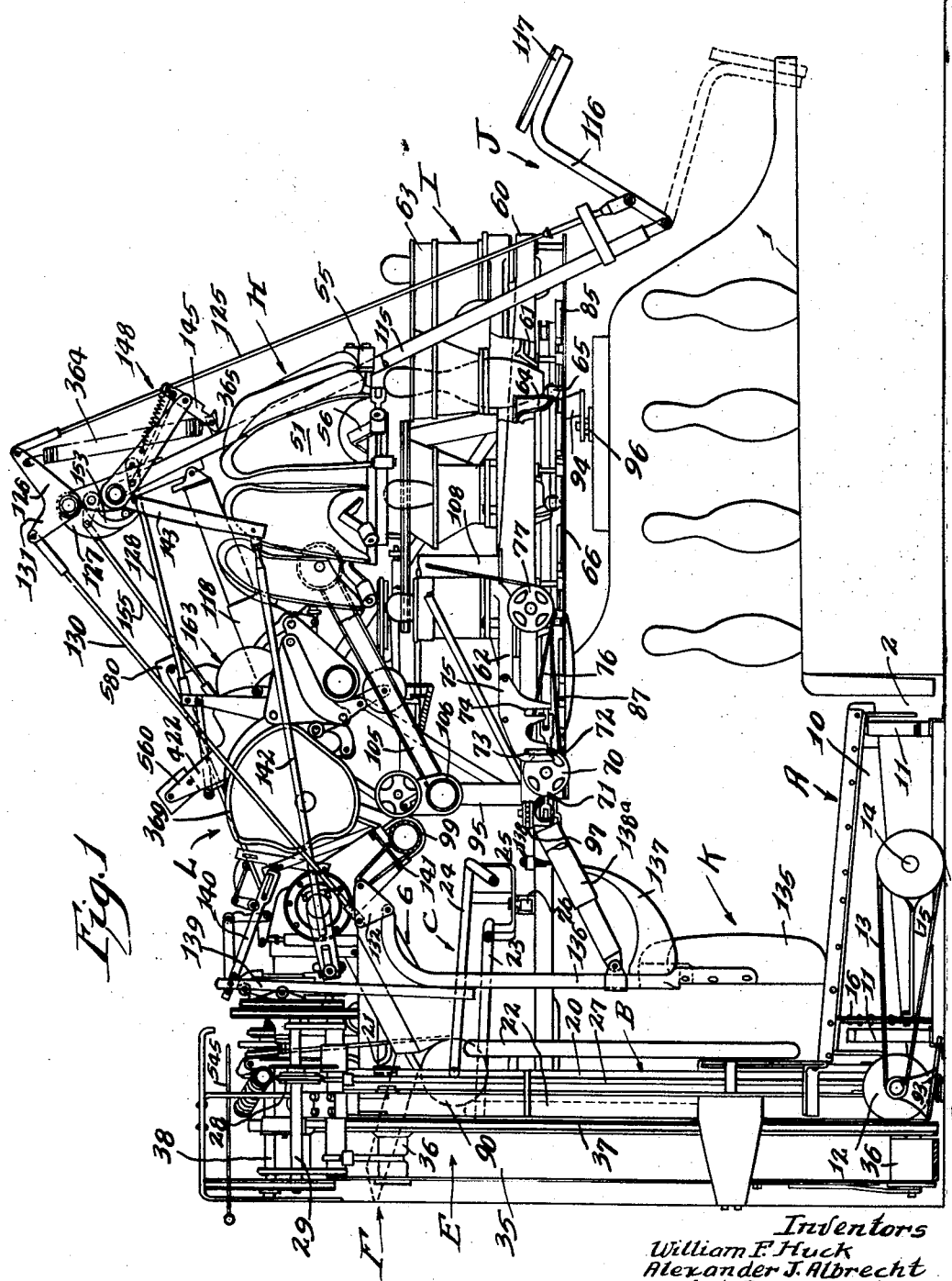

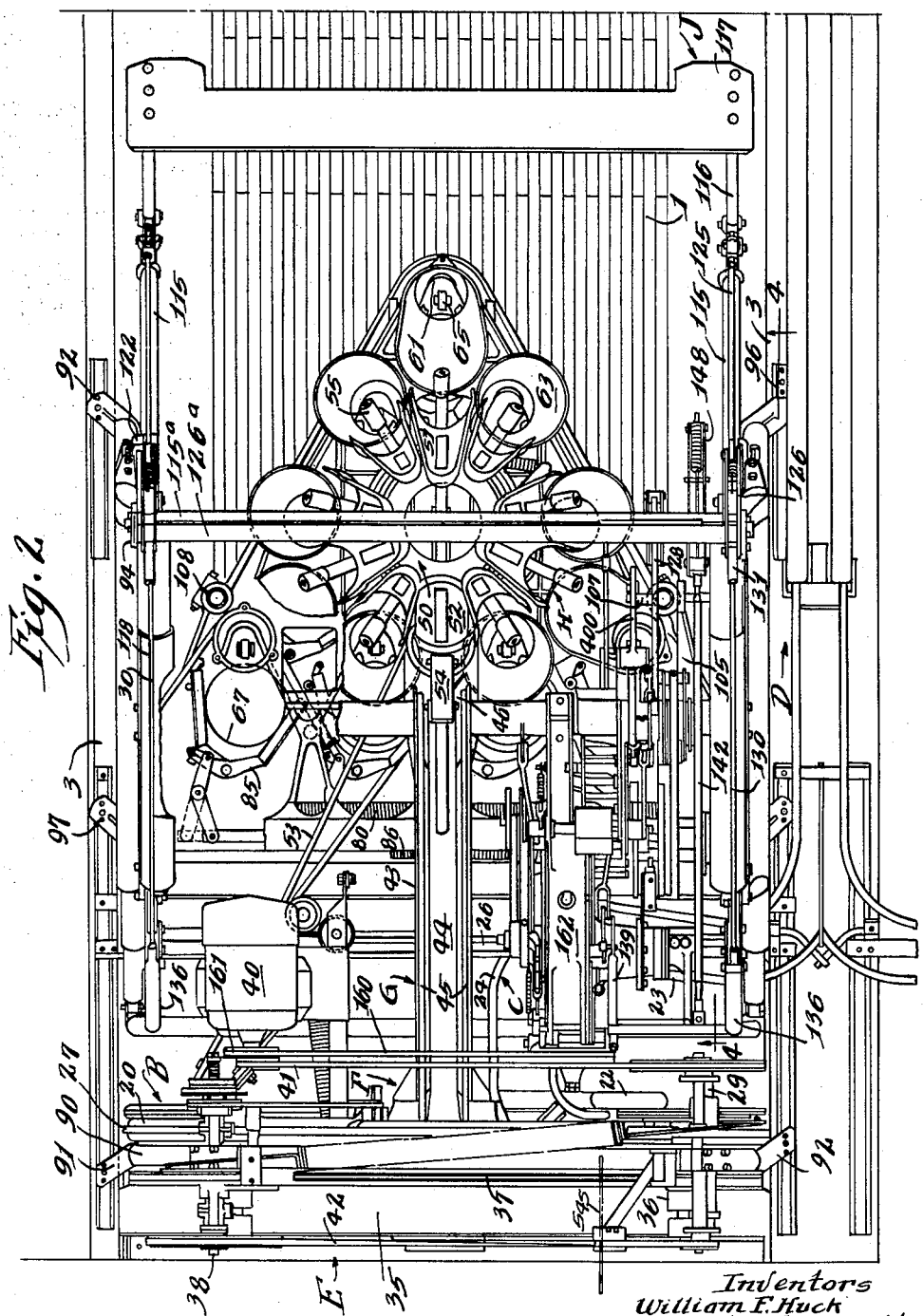

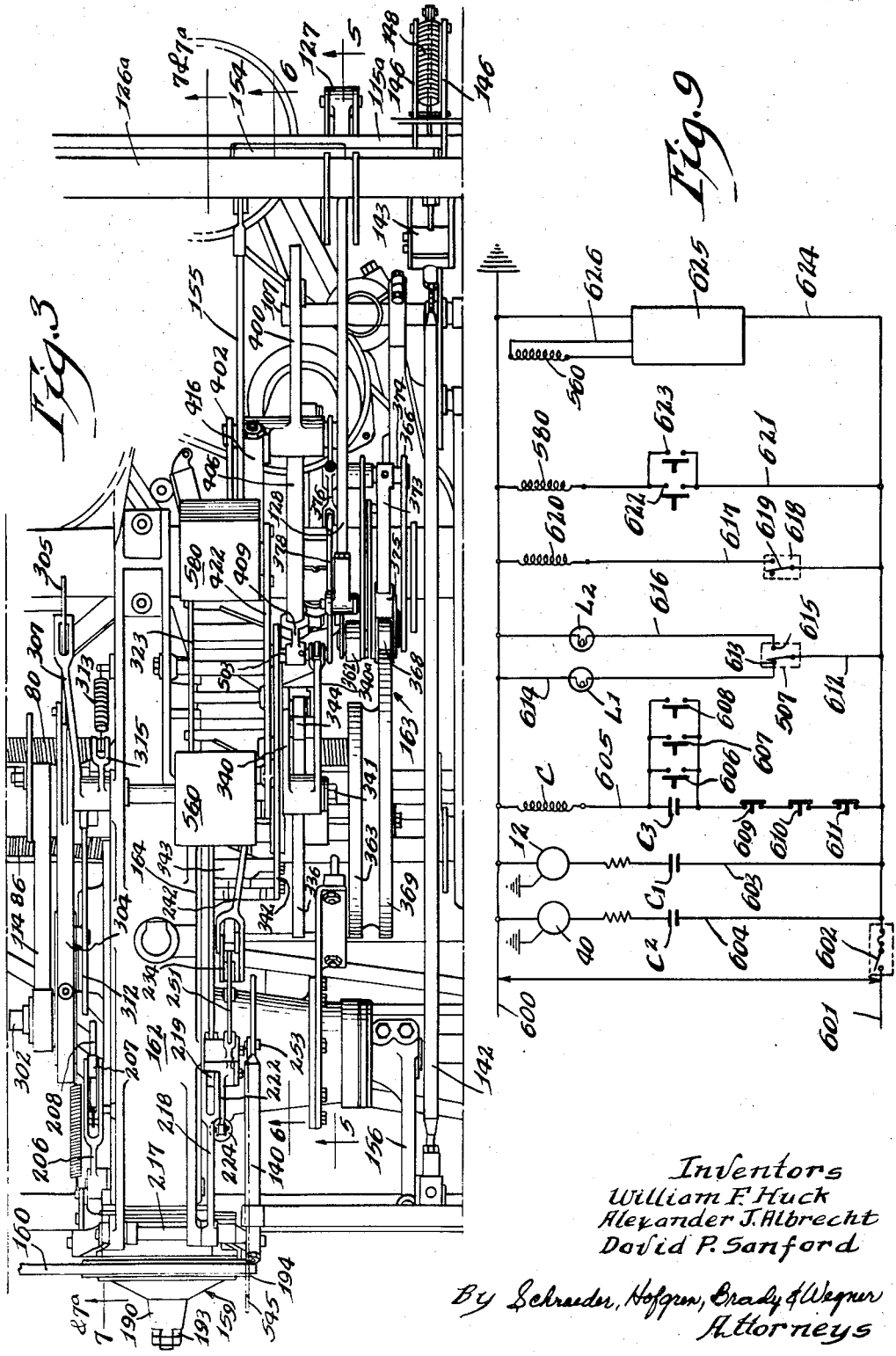

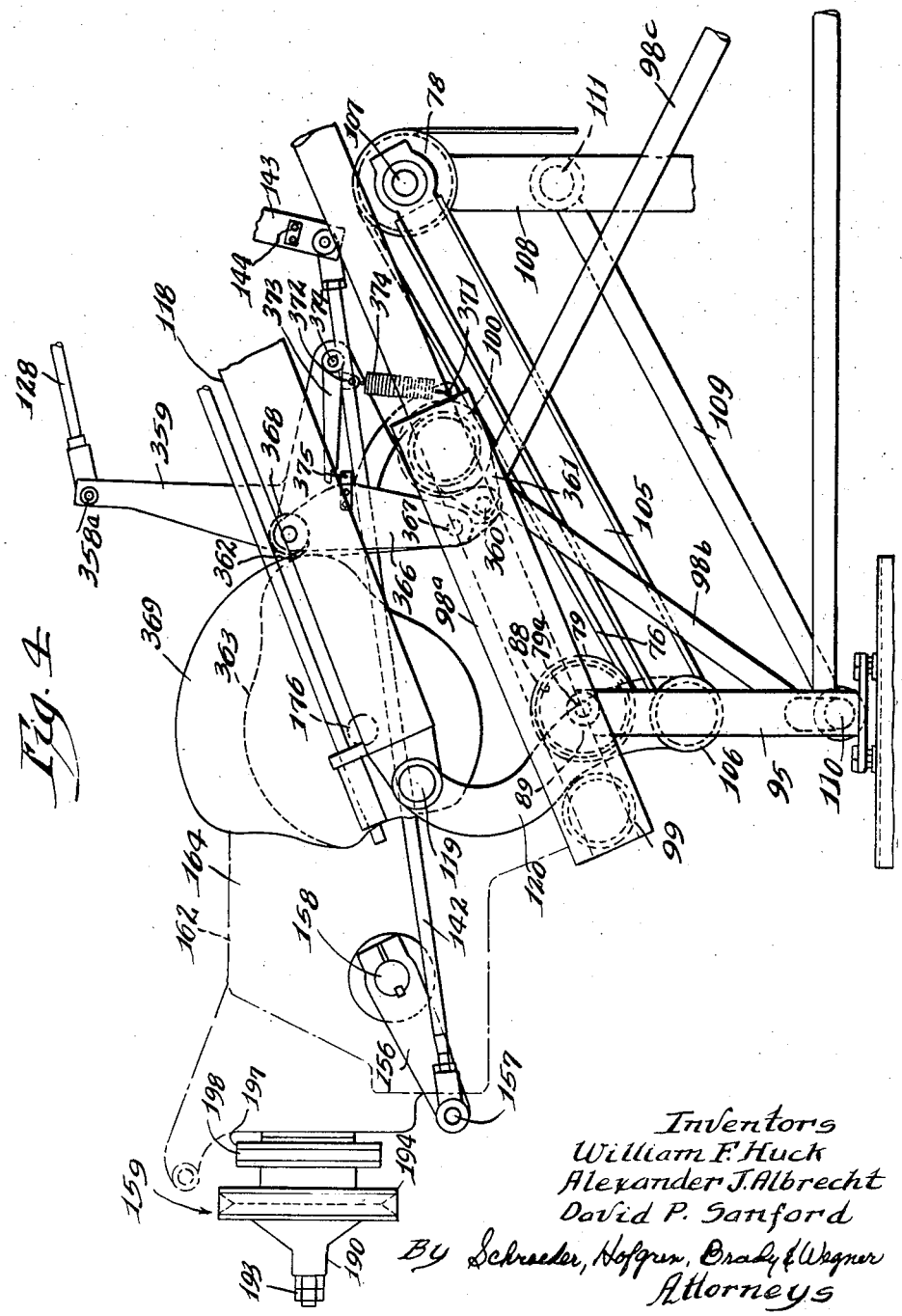

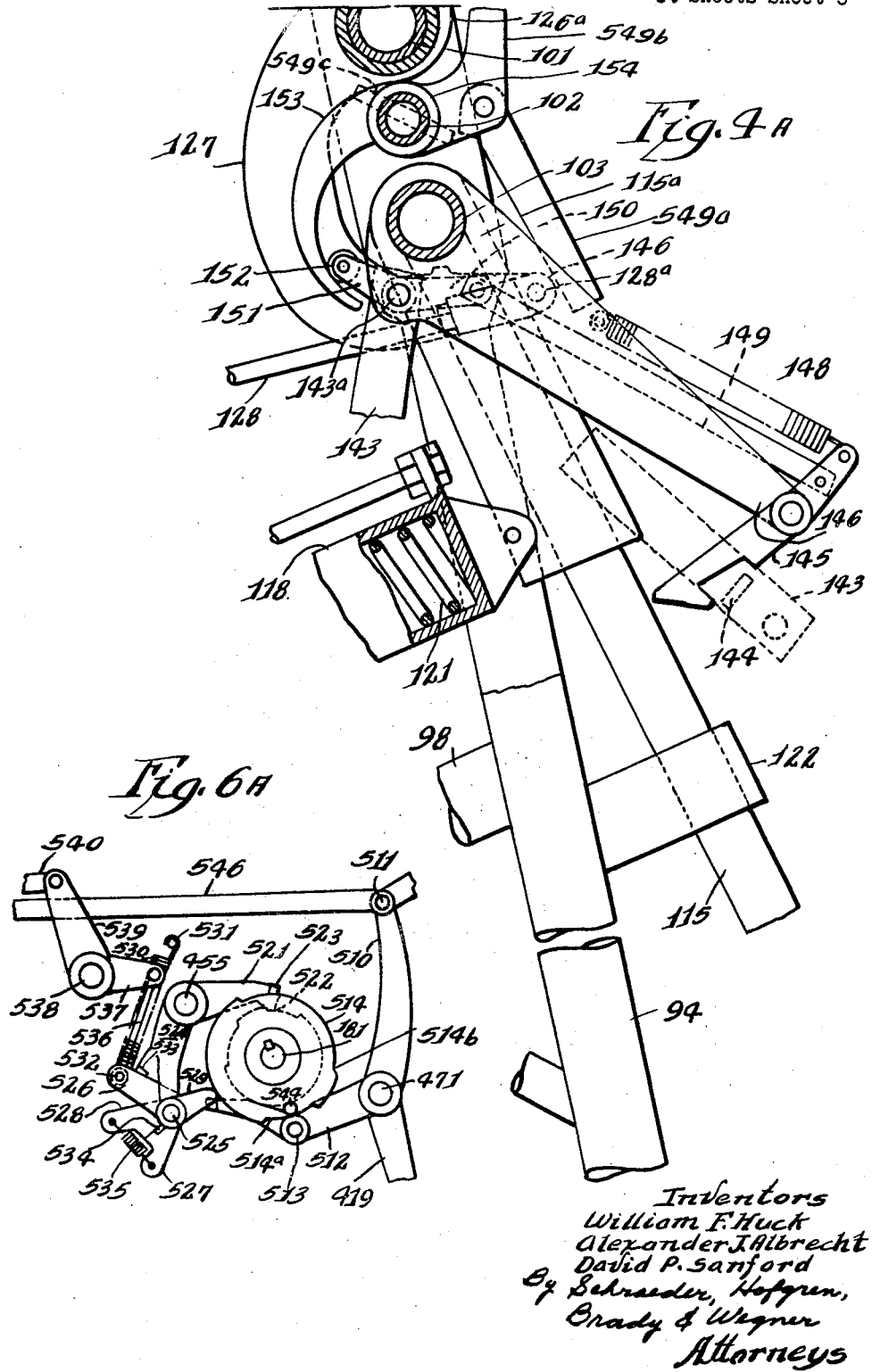

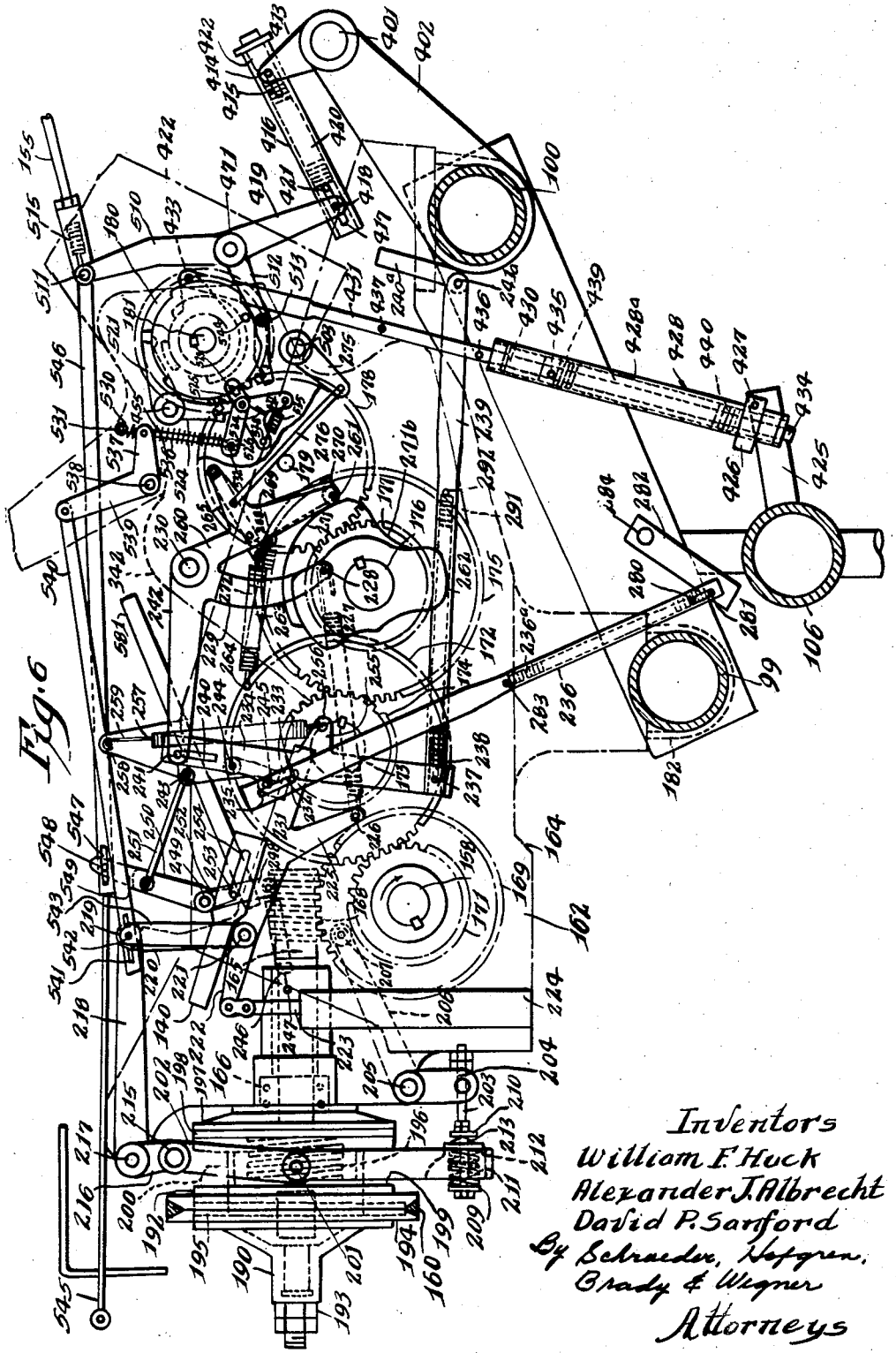

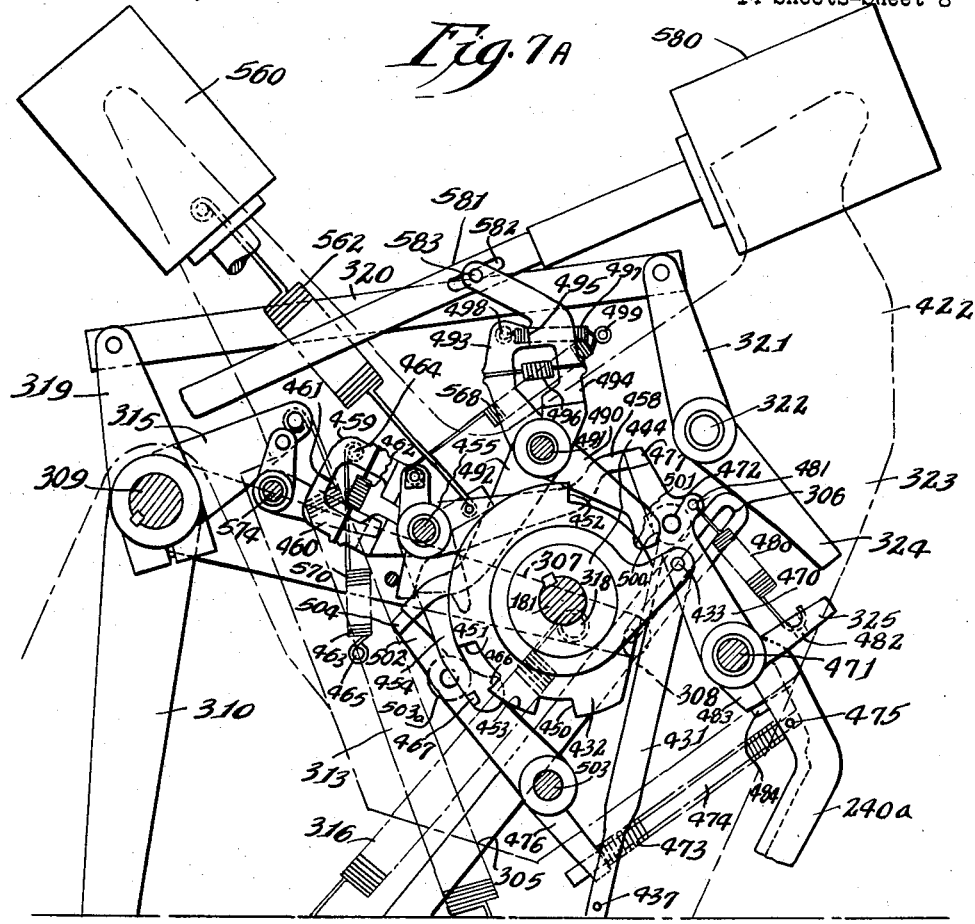
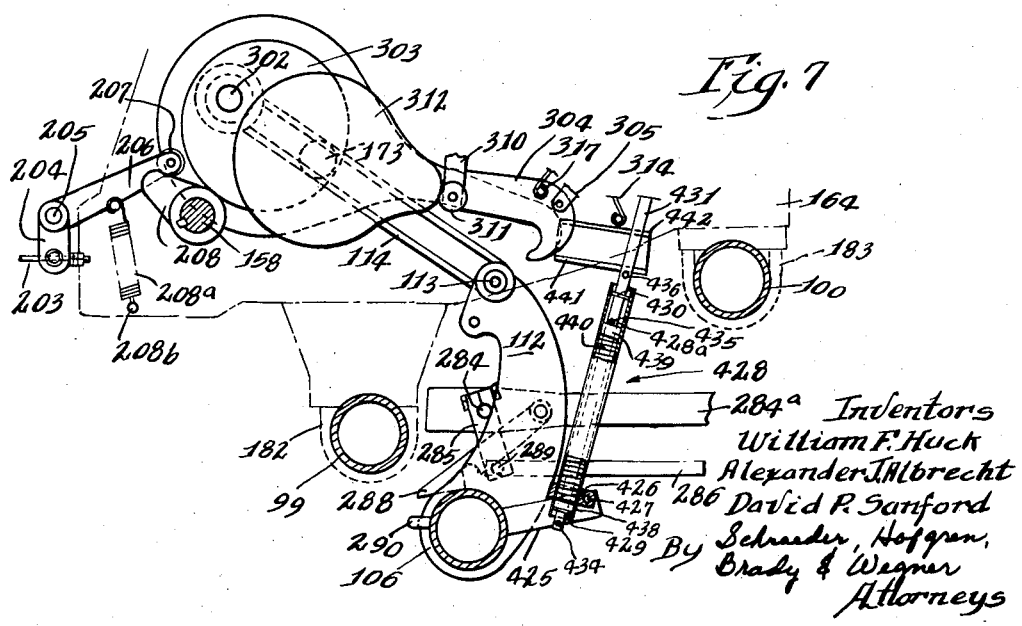

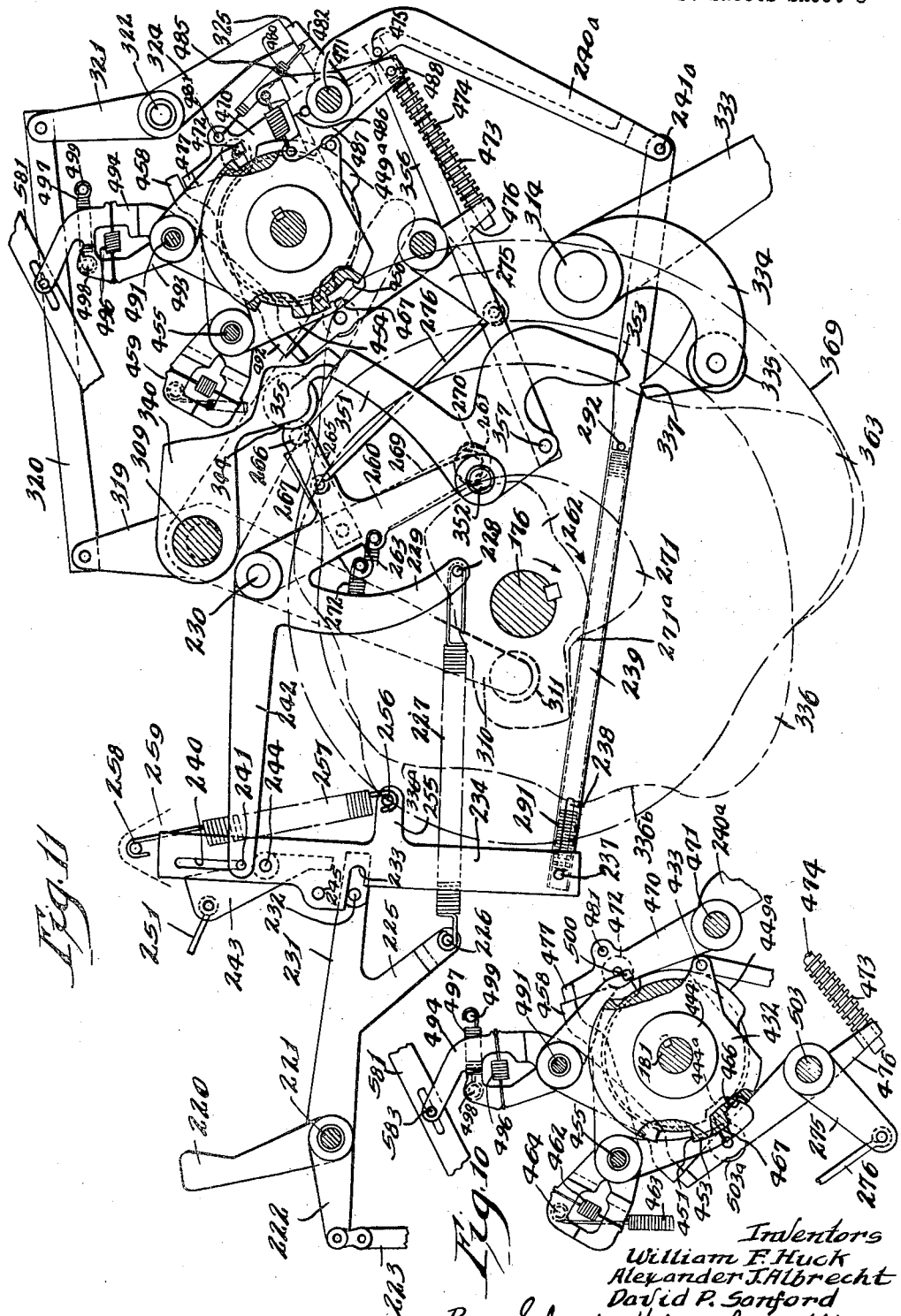

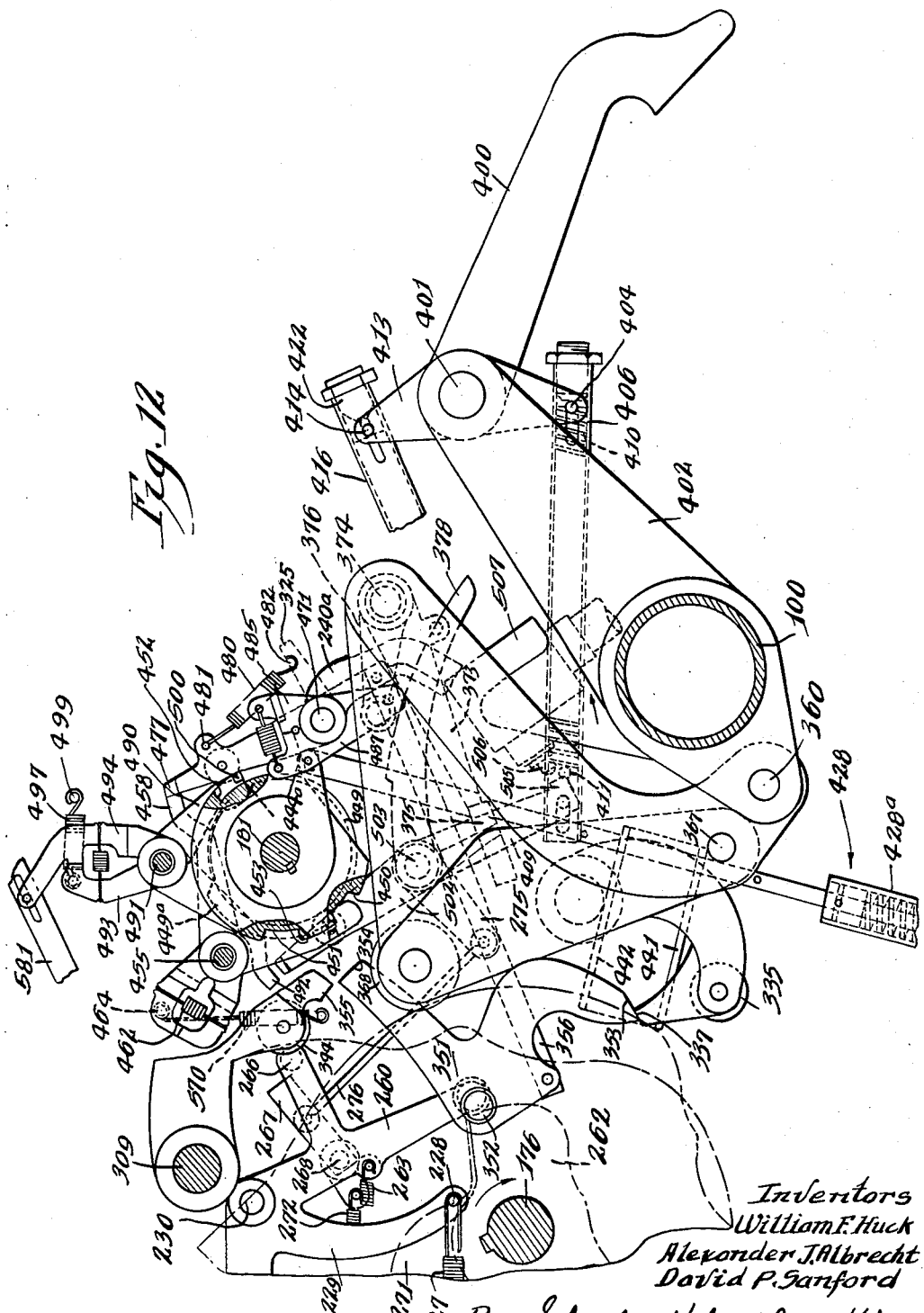

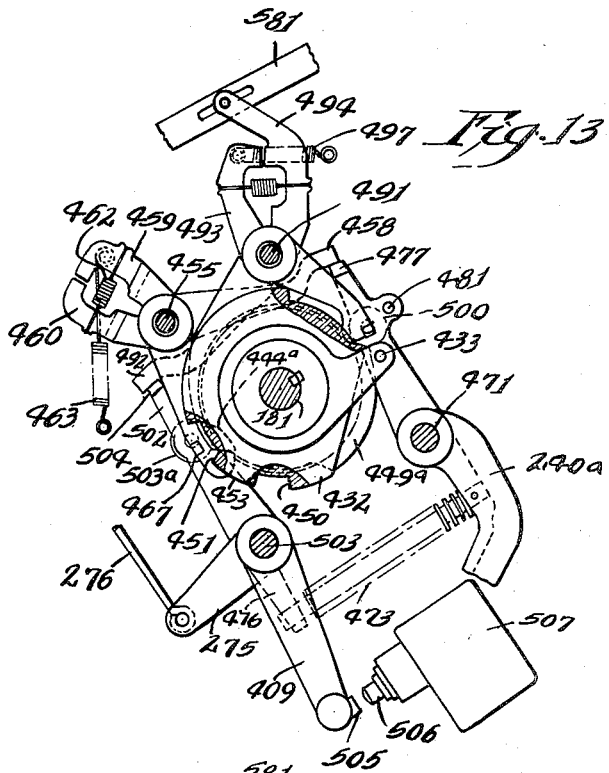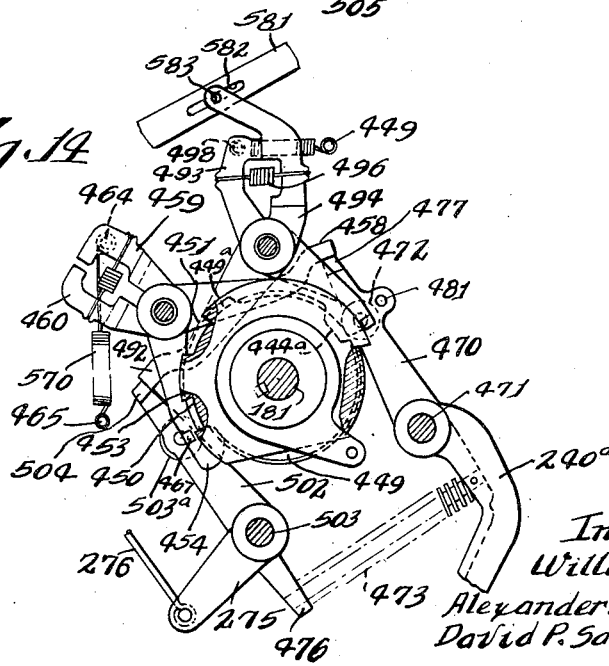

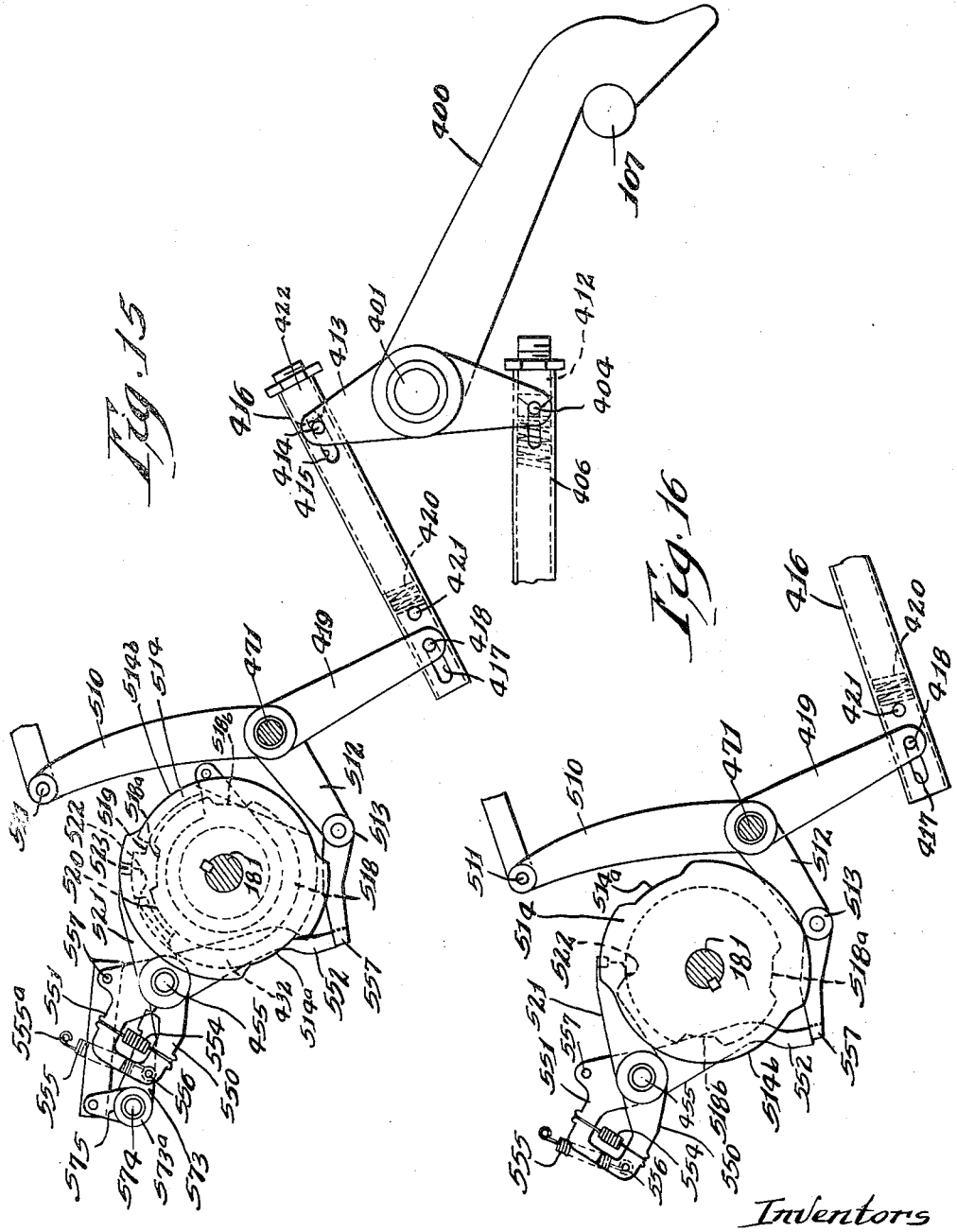

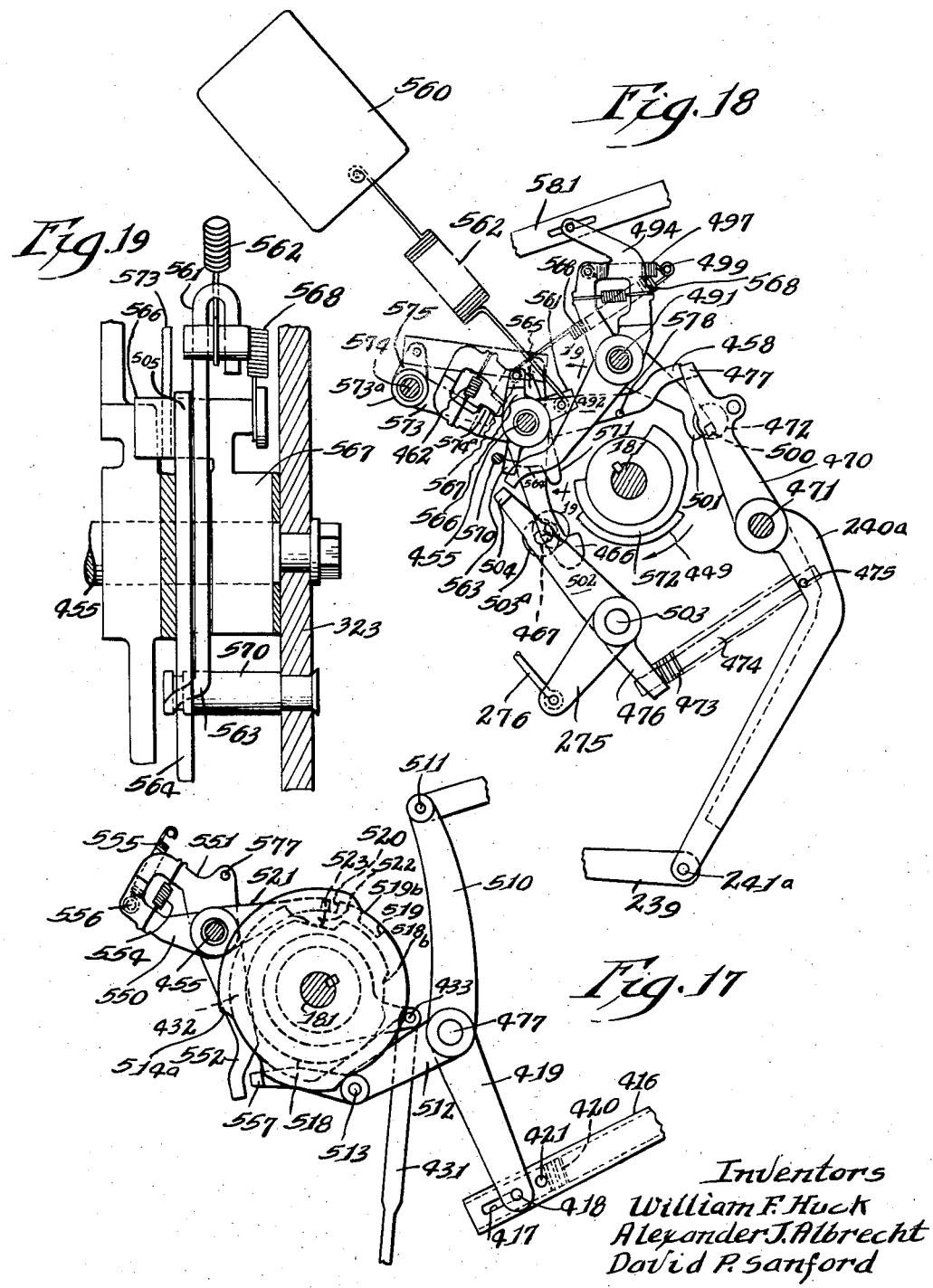

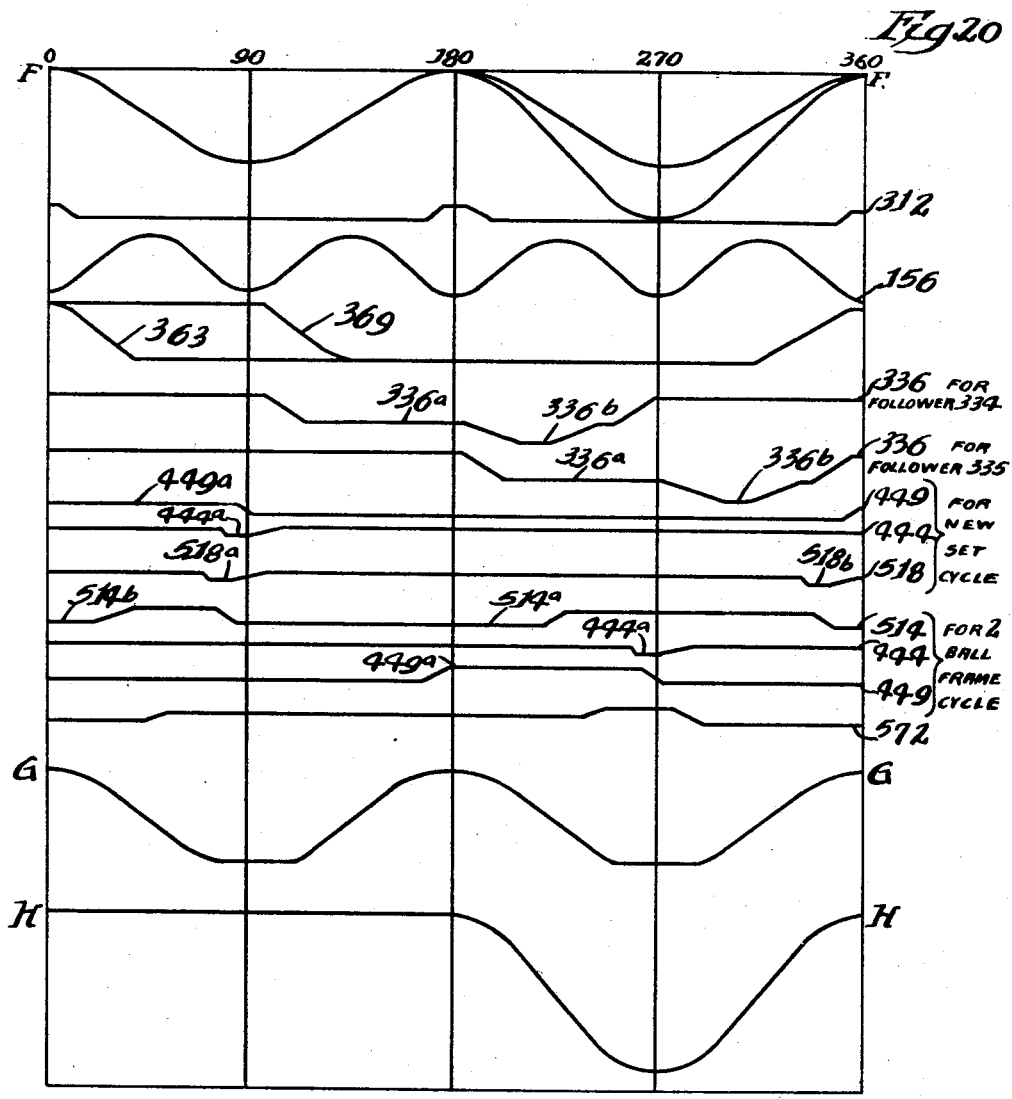

United States Patent Office 2,949,300
Patented Aug. 16, 1960

2,949,300

AUTOMATIC PINSETTERS

William F. Huck, Forest Hills, N.Y., and Alexander J. Albrecht, Teaneck, and David P. Sanford, Union, N.J., assignors, by mesne assignments, to The Brunswick Automatic Pinsetter Corporation, Paramus, N.J., a corporation of Delaware Filed Nov. 25, 1955, Ser. No. 549,075

34 Claims. (Cl. 273—43)

This invention relates to an automatic pinsetter for bowling alleys, and more particularly, an automatic pinsetter which is entirely mechanically controlled.

An object of this invention is to provide a mechanically-controlled automatic pinsetter involving relatively simple mechanical control mechanisms.

Another object of the invention is to provide a fully automatic pinsetter having a unitary mechanical control center which may be readily interchanged with similar units and wherein the control is capable of operating the machine to set and re-set pins at a speed equal to or better than that achieved by pin boys.

A further object of the invention is to provide a mechanically-controlled automatic pinsetter wherein a pinsetting and re-setting deck has a detecting stroke and controls the machine through different cycles depending upon the level to which the deck descends in its detecting stroke.

Still another object of the invention is to provide an automatic pinsetter as described in the preceding paragraph wherein the deck has upper and lower levels for receiving and setting pins, respectively, and a plurality of intermediate levels for detecting the presence or absence of bowling pins on the alley and wherein a rod movable in response to movement of the deck controls the position of a control disc for causing selective operation of other mechanical control components to control the pinsetter operation through the required cycle.

Another object of the invention is to provide an automatic pinsetter having a pinsetting and re-setting deck raised and lowered between its extreme positions by a slotted link engageable with a pin operatively connected to the deck, a movable hook member which may be placed into engagement with said pin to limit the lower level of the deck in a detecting stroke to a level above that when the deck descends under the control of the link, and mechanical control means for controlling the engagement of the hook with said pin.

Another object of the invention is to provide a fully automatic pinsetter with mechanical control wherein a pin deck causes related movement of a control disc so that when the deck is lowered in its detecting stroke, the control disc will be placed in one position if pins remain standing and will be placed in another position if a strike occurs, a new set lever is rendered operative by the control disc when a strike occurs and when a "new set" is to be made to cause a pinsetting operation, and a second control lever is operative when pins are re-set on the alley to cause the machine to be conditioned for new set operation after the rolling of a second ball.

The invention also consists of an over-cycle control for an automatic pinsetting machine wherein the machine components are cycled to go through a detecting stroke after the rolling of each ball but the cycling is modified in a two-ball frame by means operative when pins remain standing after the first ball to over-cycle the machine so that after the rolling of a second ball in a frame, the time required for the detecting stroke is omitted and the machine immediately functions to sweep away the deadwood and place a set of pins on the alley and wherein there is mechanism to maintain the clutch engaged and the deck in upper position for said overcycling.

A further object of the invention is to provide an automatic pinsetter having a mechanical control center including a member responsive to the level of the pin deck and mechanisms responsive to the position of the member for controlling the operation of the machine through either a new set or reset cycle and for modifying the operation of the machine when a standing pin has moved beyond pin pickup range.

Another object of the invention is to provide an automatic pinsetter as defined in the preceding paragraph wherein the member is in the form of a control disc rotatably positionable in positions corresponding to the level of the deck by means of a link connected between the disc and deck and wherein the control disc prevents movement of a rake control lever to modify the operation of the machine when the deck is stopped in its descent by a too-far-off-spot pin.

An additional object is to provide a mechanical control for an automatic pinsetter which includes the operation of a reset lever after the first ball in a frame to over-cycle the machine so that the machine will commence a new set operation after the rolling of the next ball and operation of a new set lever preparatory to rolling of the second ball in a frame to obtain a new set of pins after the rolling of the second ball.

The invention further consists in a mechanical control center for an automatic pinsetter in which a control shaft supports a control disc that is movable to positions corresponding to the various levels of the deck by connections therebetween and which has notches for cooperating with different control levers wherein a first lever constitutes a two-ball frame lever operable to control the machine through a two-ball frame of bowling and a second new set lever is operable to control the machine for effecting a new set operation which may be required after a strike or a first ball foul and, in any event, prior to the first ball of a frame.

Still another object of the invention is to provide an automatic pinsetter as defined in the preceding paragraph wherein the lever for controlling the machine through a two-ball frame operates mechanism to cause continued cycling of the machine until immediately prior to the sweeping operation in a cycle and operates mechanism to prevent descent of the deck during the cycling of the machine immediately prior to the sweeping operation and wherein the new set lever operates mechanism to block the pin pickup mechanism and unblock the setting mechanism carried by the pin deck so that the pin deck may function to set a new set of pins.

An additional object of the invention is to provide an automatic pinsetter having a pin deck for picking up and re-setting pins and for setting pins, a first cam follower causing the setting of pins, a second cam follower causing picking up and re-setting of pins, a cam engageable with both of said followers, and means for blocking one follower or the other depending upon whether the setting or re-setting operation is to be performed.

Another object of the invention is to provide an automatic pinsetting machine having a mechanical control comprising a "new set" lever for causing the machine to place a set of pins on an alley, a plural ball frame lever for causing the machine to set up for the rolling of a subsequent ball in a frame, and means responsive to a foul incurred in the rolling of a first ball in the frame to shift both of said levers and place a set of pins on the alley with the machine set up awaiting the rolling of a second ball in a frame.

A further object of the invention is to provide an automatic pinsetting machine as defined in the preceding paragraph wherein the means responsive to a foul requires the entry of a ball into the pit to cause shifting of said levers.

The objects of the invention generally set forth, together with other ancillary advantages, are attained by the construction and arrangement shown by way of illustration in the accompanying drawings, in which:

Fig. 1 is a side elevation of the automatic pinsetter and a portion of the alley bed with which it cooperates, with parts broken away;

Fig. 2 is a plan view of the automatic pinsetting machine, with parts broken away;

Fig. 3 is an enlarged fragmentary plan view showing the control section of the automatic pinsetter;

Fig. 4 is a fragmentary vertical section taken generally along the left hand part of line 4—4 in Fig. 2;

Fig. 4A is a fragmentary vertical section taken generally along the right hand part of line 4—4 in Fig. 2 on an enlarged scale;

Fig. 5 is a vertical section taken generally along the line 5—5 in Fig. 3;

Fig. 6 is a vertical section taken along the line 6—6 in Fig. 3 on an enlarged scale with the mounting plate at the right end of the gear box shown in phantom for clarity;

Fig. 6A is an enlarged detail view of a portion of the mechanism shown in Fig. 6;

Fig. 7 is a fragmentary vertical elevation of the lower part of the control mechanism taken along the line 7—7 of Fig. 3 with the gear box shown in phantom for clarity;

Fig. 7A is an enlarged fragmentary vertical section of the upper part of the machine taken along the line 7a—7a of Fig. 3 with the mounting plates shown in phantom for clarity;

Fig. 8 is an enlarged fragmentary horizontal section taken through the center of shaft 181;

Fig. 9 is a schematic view illustrating the electrical circuit associated with the automatic pinsetting machine;

Fig. 10 is an enlarged diagrammatic view of control mechanisms shown in Figs. 6 and 7A as they are positioned when the pin deck has descended and found standing pins;

Fig. 11 is an enlarged diagrammatic view of control mechanisms shown in Figs. 5, 6 and 7A as they are positioned when the pin deck has descended in a detecting stroke and found no standing pins;

Fig. 12 is an enlarged diagrammatic view of the control mechanism shown in Figs. 5, 6 and 7A as positioned when the pin deck has descended to re-set standing pins;

Fig. 13 is an enlarged diagrammatic view of the control mechanism shown in Figs. 5, 6 and 7A as positioned when the machine is stopped awaiting the rolling of a second ball in a two-ball frame;

Fig. 14 is an enlarged diagrammatic view of the control mechanisms shown in Figs. 5, 6 and 7A when the pin deck is down to the alley bed placing a set of pins thereon;

Fig. 15 is a diagrammatic view of a modification of the control mechanism utilized in connection with a pin that is moved out of pin pickup range with the parts positioned corresponding to their position when the pin deck is on top of an out-of-range pin;

Fig. 16 is a diagrammatic view of part of the mechanism shown in Fig. 15 with the parts positioned corresponding to the position of the deck when it is either setting or re-setting pins;

Fig. 17 is a diagrammatic view of part of the mechanism shown in Fig. 15 positioned corresponding to the position of the deck when it is picking up standing pins;

Fig. 18 is a diagrammatic detail view of the mechanism in Figs. 5, 6 and 7A and showing on an enlarged scale the mechanisms for operating the machine through a "foul" operation;

Fig. 19 is a further enlarged detail taken along the line 19—19 in Fig. 18; and, Fig. 20 is a timing diagram showing the development of the various cam surfaces and cycling of certain moving parts with respect to these surfaces.

While this invention is susceptible of embodiment in many different forms, there is shown in the drawings and will herein be described in detail a preferred embodiment of the invention and a modification thereof with the understanding that the present disclosure is to be considered as an exemplification of the principles of the invention and is not intended to limit the invention to the embodiment illustrated. The scope of the invention will be pointed out in the appended claims.

As shown generally in Figs. 1 and 2, the automatic pinsetting machine is associated with a bowling alley having an alley bed 1, a pit area 2 at the rear of the alley bed and side walls or kickbacks 3 at opposite sides of the alley bed.

The automatic pinsetting machine comprises several components. A pit conveyor, indicated generally at A is located in the pit 2 and directs bowling pins and a bowling ball toward the rear of the pit wherein ball elevating mechanism, indicated generally at B, elevates the ball from the rear of the pit to a track, indicated generally at C, which delivers the ball to the return track, indicated generally at D, located on top of one kickback 3 and the adjacent kickback of another alley.

Bowling pins are elevated from the rear of the pit by a pin elevating mechanism, indicated generally at E, which discharges the pins in succession into a tray, indicated generally at F, from where the pins pass butt end first to a cross conveyor, indicated generally at G, which carries the pins forwardly and upwardly to a discharge point where they move in succession into pockets in a turret, indicated generally at H.

A pinsetting and resetting deck, indicated generally at I, is located beneath the turret H. A rake, indicated generally at J, is mounted at the front of the machine and is cycled to function as a guard when in the dotted position and to sweep pins into the pit at the desired time during the cycling of the machine.

An upwardly-movable pit cushion, indicated generally at K, is disposed above the pit conveyor to receive the impact of a rolled ball and flying pins and functions to prevent the passage of a ball to the rear thereof when in its lower position and also to initiate operation of the machine upon movement thereof caused by the impact of a ball. A control center indicated generally at L comprises mechanical components which control the operation of the machine and is located generally above the pin deck I.

Reference may be had to the co-pending application of William F. Huck and Alexander J. Albrecht, Serial No. 534,726, filed September 16, 1955, for a more detailed description and disclosure of the pit conveyor A, the ball elevating mechanism B, the pin elevating mechanism E, the pin tray F and the cross conveyor G. The following general description of these components is believed sufficient since these components do not form a part of the present invention.

The pit conveyor A comprises a frame 10 mounted for vibrating movement on brackets 11 and has a laterally concave upper surface having its rear central portion terminating adjacent the pickup area of the ball elevating mechanism B and the pin elevating mechanism E. A motor 12, through a belt 13, drives an eccentric shaft 14 which through a flexible crank member 15 connected to a bracket 16 on the frame 10 vibrates the pit conveyor.

The ball elevating mechanism B comprises a ring-shaped member 20 mounted for rotation on guide rollers one of which is indicated at 21. A pair of curved generally vertically disposed tracks 22 are located within and cooperate with the ring-shaped member 20 to form a three-point contact with the ball and elevate the ball to the track mechanism C which is in the form of a pair of rods 23 and 24 which are supported by a framework 25 supported from a bar 26 extending across the kickbacks 3. The ball elevating ring 20 is driven by a belt 27 which is driven from a pulley 28 on a driven shaft 29.

The pin elevating mechanism E comprises a ring member 35 which has pin receiving pockets spaced apart around its inner periphery for elevating pins in succession to the tray F. The ring member 35 is supported for rotation on guide rollers 36 and the ring member 35 is driven by a belt 37 extended around its outer periphery in a groove in the ring and driven by a pulley on shaft 38. The shafts 29 and 38 are driven by a motor 40 which is connected to shafts 29 and 38 by pulleys and belts 41 and 42.

The tray F is mounted within the body of the ring-shaped pin elevating member 35 and extends generally beneath the uppermost position of the elevating member so as to receive a pin as it is discharged from a pocket on the member whether the pin is oriented with the head end leading or trailing and direct the pin to the cross conveyor G with the butt end foremost.

The cross conveyor G comprises an elongated frame 43 which extends in an upward and forward direction from the forward end of the tray F to a position above and to the rear of the turret H. The lateral central portion of the tray is depressed to form a channel 44 along which the head end of the pin may slide and belts 45 at opposite sides of the frame convey the pin along the cross conveyor to the discharge position thereof indicated generally at 46.

The turret H comprises a frame 50 having nine pin receiving pockets 51 about its periphery and a tenth central pocket 52 for receiving a tenth pin. The pocket 52 has an entrance throat extending upwardly and outwardly to a position adjacent the discharge end 46 of the cross conveyor. The turret is driven from the motor 40 by a belt 53 which drives a friction clutch (not shown) to index the turret. The indexing of the turret is controlled by pins entering pockets 51 on the turret which engage a trip member 54 pivoted adjacent the end of the cross conveyor which releases a detent from engagement with a dog on the turret frame to permit indexing of the turret by the friction clutch, there being one dog associated with each pocket. Pins are held in the pockets 51 by rollers 55 carried on a spider 56 which may be shifted with respect to the pockets 51 when it is desired to drop pins from the turret. The tenth pin is held in a tenth pocket 52 by a detent (not shown) which is operated by mechanism (not shown) to permit dropping of the tenth pin along with the other pins.

The pins are dropped from the turret H into the pin deck I which has a central deck 60 having fixed setting shoes one of which is indicated at 61. An upper setting deck 62 carries the buckets 63 into which the pins drop from the turret H and also has setting shoes one of which is indicated at 64 which cooperate with the fixed setting shoes 61 to confine a pin as indicated in Fig. 1.

Prior to setting of pins in the deck, they rest upon rollers 65 carried on a lower frame 66 attached to the central deck 60. The lower frame has openings 67 defining pin pickup areas and through which pins are set. In this position, the upper setting deck 62 has pressure plates (not shown) on the underside thereof to engage the tops of standing pins during the pickup and reset operation.

When it is desired to set pins, the upper setting deck 62 is shifted towards the rear of the machine so that the bowling pins are carried away from the fixed shoes 61 and to one side of the supporting rollers 65 so that the pins may be set through the openings 67 in the lower plate 66 by co-action between the shoes 64 and the rollers 65. This also results in shifting the pressure plates toward the rear of the machine. The means for moving the setting deck 62 includes cable-operated pulley 70 mounted for rotation on the deck which has a pair of pins 71 and 72 which engage slots 73 and 74 formed in a member 75 attached to the setting deck to shift the deck towards the rear as viewed in Fig. 1. The pulley 70 is operated by a cable 76 which passes around pulleys 77 and 78 (Fig. 4) on the deck and which is connected to a pulley 79 fixed on shaft 79a which is moved by operating mechanism described hereinafter. A spring 80 (Fig. 3) is connected to the pulley 70 and tends to rotate the pulley in a direction to shift the setting deck 62 toward the rear and maintain tension on the cable 76.

The lower plate 66, in addition to carrying the rollers 65, supports ten scissors type pin pickup mechanisms 85, one of these being clearly shown in Fig. 2, each pickup mechanism 85 being associated with an opening 67 in the lower plate 66 through which pins are set and through which a neck of a pin extends during pickup operation. The scissors pickup mechanisms are urged towards pin engaging positions by a spring 86 acting through connecting lever mechanisms and the control of the scissors pickup mechanisms is carried out by a cable 87 passing around pulleys (not shown) disposed on the same shafts and inwardly of the pulleys 77 and 78 on the pin deck. The cable 87 is secured to a pulley 88 on a sleeve 89 disposed inwardly of pulley 79 and rotatably mounted on shaft 79a and is operated by mechanism described hereinafter.

Reference may be had to the co-pending application of David P. Sanford, Serial No. 489,107, filed February 18, 1955, now Patent No. 2,817,528, dated December 24, 1957 for a more detailed description of the lower plate 66 and the scissors pin pickup mechanism.

The ball elevating mechanism and the pin elevating mechanism E have their guide rollers supported on a framework comprising an annular ring 90 which is secured to the top of the adjacent kickbacks at their rear by brackets 91 and 92 and on the floor of the pit by bracket 93.

The forward frame comprises upwardly-extending rods 94 and 95 at each side of the alley which are secured to the adjacent parts of the kickbacks by brackets 96 and 97, respectively. A rod 98 at each side of the alley extends between the rods 94 and 95 and somewhat to the rear of rod 95 so as to form a support for a plate 98a having a tube 99 extending transversely of the alley. A pair of diagonal braces 98b and 98c are provided. A frame rod 100 is connected between the plates 98a, and the upper ends of the frame members 94 support a transverse rod 102 and stubs 101 and 103 upon which parts are rotatably mounted.

The deck I is supported from the vertical frame members 95 by the upper drive arms 105 located at each side of the alley and connected at one of their ends to a tubular sleeve 106 rotatably mounted on stubs secured to the vertical frame members 95 and at their other ends having pins 107 pivotally connected to posts 108 extending upwardly from opposite sides of the deck. Lower guide rods 109 are pivotally connected between the stubs 110 on the vertical frame member 95 and pins 111 on the vertical posts 108 to form, with the arms 105, parallelogram supports for the deck.

A pair of spaced arms, one being shown at 112, connected to the sleeve 106 (Fig. 7) supports a pin 113 therebetween which is slidably engaged by a slotted link 114 to cause raising and lowering of the deck by mechanism described hereinafter.

Downwardly-extending rods 115 at each side of the machine are integral with a sleeve 115a pivotally mounted on stubs 103 for oscillating movement. The rods 115 pivotally support arms 116 at their lower ends and the arms 116 have a rake board 117 extending therebetween and transversely of the alley.

An extensible housing 118 (Figs. 1 and 4) extends rearwardly from each of the rods 115 and connects at its rear to a pivot pin 119 supported by an arm 120 fixed to the sleeve 106. A spring 121 within the extensible housing functions as a counterbalance for both the deck I and the rake J and urges the rake arms 115 against stops 122 carried on the frame members 94.

The raising and lowering movement of the rake board 117 is caused by corresponding movement of a link 125 (Fig. 1) at each side of the machine which extends upwardly and engages with a bell crank 126 at each side of the machine which cranks are interconnected by a sleeve 126a rotatably mounted on the stubs 101, and pivoting of the bell cranks is caused by movement of an arm 127 secured to the sleeve 126a.

The arm 127 is connected to a link 128 by a pin 128a which is shifted by a cam and follower mechanism described hereinafter to control the raising and lowering of the rake board 117.

A connecting link 130 connects between an arm 131 of the bell crank 126 and a triangular plate 132.

The pit cushion K includes a pad 135 connected between vertically-extending bars 136 located at opposite sides of the alley and which pivotally connect to the plates 132. An apron 137 is draped downwardly from a cross piece 138 extending between the kickbacks 3 and the lower end of the apron is secured to the top of the pit cushion. Each of the bars 136 has a dashpot 138a connected thereto which extends forwardly and upwardly and connects to a bracket connected to the frame members 95. The nearer bar 136, looking at Fig. 1, has a rod 139 connected to the upper part thereof which has its upper end bent toward the center line of the machine which connects with a link 140 in a clutch operating mechanism so that engagement of a ball with the pit cushion causes pivoting of the pit cushion and its supporting framework about the plate 132 and shifting of the link 140 so as to cause engagement of a driving clutch as more fully described hereinafter. The connecting link 130 between the bell crank 126 and the plate 132 operates to cause raising of the pit cushion when the rake board 117 is lowered to the alley bed and to cause lowering of the pit cushion when the rake board is elevated. The plate 132 is pivotally mounted on a V-shaped frame member 141 extending upwardly at an angle from the frame shaft 99. The members 125, 126, 130, 132 and 136 are provided at both sides of the machine as will be evident in Fig. 2.

The rake J is moved from its guard position in front of the machine and on the alley bed toward the pit and back to its guard position in a sweeping operation by a crank link 142 which is pivotally connected at one end to an oscillating grab member 143 which is pivotally mounted on a pin 143a (Fig. 4A) carried in a bracket on the sleeve 115a. The grab member 143 carries a catch member 144 which, as shown in the dotted line position of Fig. 4A, may be engaged by a latch 145 to cause the rake to move with the crank link 142. The latch 145 is pivotally mounted on a pair of arms 146 which are connected to the rake support sleeve 115a on the left side of the machine looking toward the rear thereof. The engagement or non-engagement of the latch 145 with the catch member 144 is determined by a spring 148 which normally urges the latch into engaging position with the catch member and a link 149 which determines the effectiveness of the spring 148. The link 149 is pivoted to an arm 150 (Fig. 4) of a bell crank and the other arm 151 thereof carries a roller 152 in position to engage with a cresent-shaped lever 153 which is connected to a sleeve 154 rotatably mounted on the frame shaft 102. The rotative position of this sleeve and the crescent-shaped lever 153 is determined by a link 155 which is operated by cam and follower mechanism described hereinafter.

The crank link 142 is pivotally connected to a crank 156 by a pin 157 and is driven by a shaft 158.

A clutch, indicated generally at 159, is driven by a belt 160 which passes around the pulley 161 on the shaft of motor 40 (Fig. 2) and drives a gear box 162 and operating and control mechanism indicated generally at 163 attached to the gear box including the control center L.

The gear box casing 164 (Fig. 6) rotatably supports an input shaft 165 mounted in bearings, one of which is shown at 166, and the input shaft has a worm 168 meshing with a gear 169 keyed to a shaft 158. A gear 171 also keyed to the shaft 158 drivingly engages with a gear 172 keyed to the shaft 173. A gear 174 keyed to the shaft 173 drivingly engages a gear 175 keyed to a shaft 176. A gear 177 keyed to the shaft 176 drivingly engages a gear 178 rotatably mounted on shaft 179 and the gear 178 drivingly engages a gear 180 keyed to the shaft 181.

The relationship between the gearing is such that in one normal machine cycle including two descents and ascents of the deck I, the shafts 176 and 181 make one revolution, the shaft 173 makes two revolutions and the shaft 158 makes four revolutions.

The gear box housing 164 is supported on frame rods 99 and 100 by brackets 182 and 183 (Fig. 7), respectively.

The clutch 159 comprises a disc 190 and spool 192 which are splined to the input shaft 165, the disc 190 being adjustably backed up by nuts 193 and a threaded end of the input shaft. A pulley 194 is rotatably mounted on the input shaft 165 and positioned between the disc 190 and spool 192 and has rings of material 195 with a high friction co-efficient positioned to engage with the disc and spool when the clutch is engaged.

A spring 196 abuts against a shoulder (not shown) on shaft 165 and an inner surface of the spool 192 so as to urge the spool toward the left as viewed in Fig. 6 and force the spool, the pulley and the disc together in frictional running engagement. When the clutch is disengaged by shifting of the spool toward the right or forwardly of the machine, the spool and, therefore, the input shaft are rapidly brought to a halt by frictional engagement between the friction material 198 carried on the spool and the portion 197 of the gear box housing.

The spool 192 has a groove 199 in which a pair of shoes one of them being indicated at 200 is slidably mounted and the shoes are pivotally mounted on pins 201 carried on a yoke 202. The yoke 202 at its lower end slidably receives a pin 203 fastened in an arm 204 of a bell crank pivoted at 205 (Fig. 7) and the other arm 206 of the bell crank forms a cam follower having a follower roller 207 (Fig. 7) which engages or follows a cam 208 keyed to the shaft 158, and is urged into following position by a spring 208a connected between the arm 206 and a pin 208b on the gear box housing.

The pin 203 carries a pair of discs 209 and 210 at opposite sides of the yoke and a spring 211 surrounds the pin and acts between the disc 209 and a shoulder 212 on the lower end of the yoke so as to cause a projection 213 on the yoke to engage against the disc 210. The opening in the yoke which receives the pin is over-sized so as to allow pivoting of the pin with respect to the yoke. The upper end of the yoke has a pivot pin 215 which connects the yoke to an arm 216 of a bell crank pivoted at 217 to the gear box housing 164 and the other arm 218 of the bell crank carries a roll 219 positioned for selective engagement with a stop arm 220 forming one arm of a multi-arm lever pivoted at 221 on the gear box housing.

The multi-arm lever has, in addition to the arm 220, an arm 222 (Figs. 6 and 11) which connects to a rod 223 of a dashpot 224. Another arm 225 has a pin 226 to which a spring 227 is attached and the other end of the spring is slidably connected to a pin 228 on an arm 229 which is pivotally mounted on a shaft 230 attached to the gear box housing. Another arm 231 of the multi-arm lever has a pin 232 engageable in an open slot 233 of a trigger link 234. The pin 232 is also slidably received in a slot 235 in a connecting link 236.

The trigger link 234 has a pin 237 at its lower end which is slidably received in a slot 238 in a connecting link 239. A slot 240 at the upper end of the trigger link slidably receives a pin 241 carried on an arm 242 integral with the arm 229 and a trigger 243 is pivotally mounted to trigger link by a pin 244. The trigger 243 is urged against a stop pin 245 on the trigger link by means including a spring 246 connected to the housing by a pin 247 and at its other end fastened to an arm 248 of a bell crank pivotally mounted on a pin 249 and the other arm 250 of the bell crank is connected to the trigger by a link 251.

An arm 252 integral with the bell crank arms 248 and 250 has a pin 253 slidably mounted in a slot 254 in the link 140 which connects to the rod 139 extending upwardly from the pit cushion K.

A lateral extension 255 of the trigger link 234 carries a pin 256 to which one end of a spring 257 is connected and the other end of the spring is connected to a pin 258 supported by an upward projection 259 of the gear box housing 164.

As stated previously, the arms 229 and 242 are integral and form in part what may be termed the re-set mechanism or the clutch control mechanism. The re-set mechanism also includes an arm 260 integral with the arms 229 and 242 which carries at its lower end a follower roller 261 which engages with a cam 262 keyed to the shaft 176 and which is urged into engagement by a spring 263 connected between the arm 260 and a catch opening 264 on the gear box housing. A lateral extension 265 of the arm 260 carries a roll 266 which is selectively engageable by a latch 267 pivotally mounted on a pin 268 carried on an arm 269 rotatably mounted on the shaft 230. The arm 269 carries a cam roller 270 which is engageable with a cam 271 keyed to the shaft 176 and the arm 269 is urged into following relationship by a spring 272 connected between the arm 269 and the catch opening 264. The position of the latch 267 is determined by an arm 275 forming part of the mechanical control center of the machine and which is connected to the latch by a link 276.

The connecting link 236 has a slot 280 at its lower end in which a pin 281 mounted on an arm 282 is slidably mounted. A spring 236a within the connecting link extends between the pin 281 and a pin 283 on the connecting link so as to form a yieldable connection. The arm 282 is pivotally mounted on a shaft 284 supported in frame member 284a to which an inboard arm 285 is connected and which connects with a rod 286 having a cam follower roller (not shown) which engages a cam surface on the turret H, not shown, and which functions to shift rod 286 toward the rear of the machine when the turret has indexed to receive the first pin of a new set. This constitutes a signal that the turret has dropped ten pins from the turret H into the pin deck I. This signal is stored in the mechanism by means of a latch 288 which is positioned to engage a pin 289 forming the connection between the arm 285 and the rod 286 and this signal is stored until such time as a set of pins are placed on the alley which means that the deck supporting sleeve 106 has rotated in a clockwise position a sufficient distance to carry a projection 290 into engagement with the latch which raises the latch and releases the pin 289.

The connecting link 239 has a spring 291 disposed therein which engages between the pin 237 on the trigger link 234 and a pin 292 on the link 239 which forms a yieldable connection. The forward end of link 239 is connected to an arm 240a of the mechanical control center by a pin 241a.

In operation, the cam 208 on the shaft 158 rotates through four revolutions in each normal machine cycle so that the cam follower arm 206 is operated four times in each cycle to shift the lower end of the yoke 202 toward the front of the machine and cause disengagement of the clutch if the stop arm 220 is positioned under the roller 219. When the stop arm 220 is positioned under the roller 219, the pivot pin 215 becomes fixed so that the shifting of the lower end of the yoke causes shifting of the spool 192 toward the front of the machine to disengage the clutch. In this action, the spring 211 is stronger than the spring 196 so that the latter spring yields to permit shifting of the spool. The cam 208, because of its four revolutions in a cycle, sets up to disengage the clutch at 90°, 180°, 270° and 360° of the machine cycle. The actual determination as to whether the machine will stop is made by the stop arm 220 which may be positioned under the roller 219 to stop the machine at either 90°, 180°, or 360° of the machine cycle.

In starting the machine, a ball hitting the pit cushion K operates through the cushion supporting bar 136, the rod 139 and the link 140 to shift the bell crank having arms 248 and 250 to withdraw the trigger 243 from under the pin 241 on the arm 242 which permits the trigger link 234 to jump upwardly under the urging of springs 227 and 257 (Fig. 11), this upward movement being limited by engagement of pin 241 with the bottom of the slot 240 in the trigger link. The upward movement of the trigger link permits following movement of the arm 231 of the multi-arm lever and its pin 232 under the urging of the spring 227 which causes the stop arm 220 to move away from the roller 219 so that the clutch may engage under the urging of spring 196.

When the machine commences operation, the cams 262 and 271 on shaft 176 commence rotating in a clockwise direction looking at Figs. 6 and 11 and, with the latch 267 in engagement with the roll 266, the follower roller 270 on the arm 269 follows cam 271 until the follower reaches a dwell 271a on the cam which causes raising movement of the re-set arm 242 a distance which is not sufficient to permit the trigger 243 to move under the pin 241 on the re-set arm but which is sufficient to permit the re-set arm 229 to swing to the left a sufficient distance to release the pull on spring 227 which extends between this arm and the arm 225. This dwell is sufficient to extend on either side of the mid-point of the machine cycle; namely, 180°, so that at this time a signal may be sent to the clutch to indicate whether the machine must stop to await ten pins being set in the pin deck I for setting thereof or whether the machine may continue to operate through the remainder of the cycle when pins are to be set on the alley and the pins for this purpose are in the pin deck I. Movement of the connecting link 239 forwardly by a corresponding movement of the arm 240a occurs at approximately 90° of machine cycle when new pins are to be subsequently placed on the alley which causes pivoting of the trigger link forwardly about the pin 241 on the re-set arm 242 a sufficient distance so as to release the pin 232 on the arm 231 of the multi-arm lever from the open slot 233 on the trigger link and with the multi-arm lever being overbalanced in a clockwise direction, it will be entirely under the control of the connecting link 236 which has the slot 235 at its upper end slidably engageable with the pin 232. If the connecting link 236 is in its lower position, this will cause the stop arm 220 to be positioned under the roller 219 so as to set up the machine for stopping when the cam 208 shifts the cam follower 206 (Fig. 7) outwardly. If the turret has deposited ten pins in the setting deck, the rod 286 will have been shifted rearwardly to cause raising movement of the connecting link 236 which will pivot the multi-arm lever counterclockwise and lower the stop arm 220 out of position to engage the roller 219. If the signal from the turret comes at times other than 180° of machine cycle, this signal will be stored by the latch 288 and the spring 236a forming part of the connecting link will be compressed until such time as the pin 232 is freed for movement independently of the trigger link 234 by forward movement of the connecting link 239.

The projection 290 on the deck supporting sleeve 106 operates to release the stored signal whenever the deck has descended to set the pins that have been carried therein since the movement of the deck to setting position carries the projection 290 under the end of latch 288 to raise it from engagement with the pin 289 connected between the rod 286 and the arm 285 so that the mechanisms are set up to receive a new signal that the deck has received pins from the turret subsequent to the time the deck has been emptied.

Continued rotation of the cam 271 carries the follower 270 onto the extreme low on the cam which is sufficient to raise the re-set arm 242 a distance sufficient to permit the trigger 243 to snap under the pin 241 under the urging of the spring 246 and immediately thereafter the follower 270 rides onto the high part of the cam to lower the re-set arm 242 and, because of the engagement between the trigger 243 and pin 241, cause lowering of the trigger link 234 which rotates the multi-arm lever in a clockwise direction to position the stop arm 220 under the roller 219 to set up the machine for stopping at 360° of machine cycle.

The foregoing has described the operation with the latch 267 in engagement with the roll 266 on the arm 260 of the re-set mechanism. At 270° of machine cycle, the arm 275 may be pivoted in a clockwise direction to release the latch 267 by upward movement of connecting link 276 which will shift the control of the re-set arm 242 from the arm 269 to the arm 260 and the follower roller 261 so that from 270° of machine cycle, the cam 262 controls. The cam 262 varies from cam 271 in that the high thereof is positioned 90° of machine cycle subsequent to that of cam 271 so that the stop arm 220 is positioned under the roller 219 after 90° beyond the end of normal machine cycle and into the next machine cycle or a total of 450° from the beginning of the normal machine cycle. This over-cycling occurs when the machine is to next operate after the rolling of a second ball in a frame wherein the rake J will sweep pins into the pit and the deck I will then set pins on the alley bed.

As described previously, the deck I is supported by vertical posts 108 pivotally connected to drive arms 105 connected to the tubular sleeve 106. The sleeve 106 has the upwardly extending plates 112 with a pin 113 extending between them. The pin 113 is in sliding engagement with the slotted link 114 which is connected at its upper end to a crank pin 302 mounted on a crank disc 303 which is rotatably mounted on shaft 173.

A hook member 304 has an annular end which is rotatably mounted on the periphery of the crank disc 303. It will be noted that the throw imparted to the slotted link is substantially greater than the throw imparted to the hook member 304.

The pin deck I has an upper position immediately under the turret H and the lowest position of the pin deck is that attained when the deck is placing a set of pins on the alley bed. The movement of the deck to the latter position is caused by the weight of the deck acting against the counterbalancing springs 121 and is permitted by the movement of the slotted link. When the deck is to set pins, the hook member 304 is held out of engagement with the pin 113 by mechanism hereinafter described.

The return of the deck to its upper position is caused by the slotted link 114.

The pin deck, after the rolling of the first ball in a frame is moved through a detecting stroke wherein the deck will stop on the tops of standing pins or slightly lower if there are no standing pins so that the deck in this position indicates the absence of standing pins. This position is obtained when the hook member 304 is in engagement with the pin 113 and, because of the shorter throw of the hook member, the movement of the deck terminates at the strike-detecting position while the slotted link may over-travel the pin 113. The deck may stop in positions above the strike level because of the yieldable connection between the hook member 304, slotted link 114, and the pin 113 when the deck lands on a pin that is out of range of the pin pickup mechanism or when the deck lands on standing pins which are to be picked up, the latter two levels being at slightly different elevations.

The hook member 304 is connected by a link 305 (Figs. 7 and 7A) having a slot 306 to a bell crank having an arm 307 with a pin 308 slidable in the slot 306 and fixed to a shaft 309 rotatably mounted on the gear box housing. Another arm 310 of the bell crank carries a cam follower roller 311 which follows a cam 312 fixed to the shaft 173 which is driven two revolutions in a normal machine cycle.

A spring 313 extends between a pin 314 on the gear box housing and an extension 315 integral with the bell crank arms 307 and 310 so as to cause the cam follower roller 311 to follow the cam 312. A tension spring 316 extends between a pin 317 on the hook member 304 and a pin 318 on the bell crank arm 307 and acts to maintain pin 308 in the bottom of slot 306 in link 305.

As shown in Figs. 7, the follower roller 311 is on the high of cam 312 and when the machine commences operation, the cam rotates in a counterclockwise direction to carry the follower roller onto the low of the cam and the hook member 304 moves into engagement with the pin 113 under the urging of the spring 313 and the hook member stays in engagement until 180° of machine cycle when the deck is again in its elevated position and the follower roller goes onto the high of cam 312 so as to release the hook member 304 from the pin 113. As the cam 312 starts its second revolution in a cycle, the hook member 304 will go back into engagement with the pin 113. It will be noted that with this operation the hook member 304 controls the descent of the deck when the deck first descends after a rolling of a first ball in a frame and also contols the descent of the deck if the deck is to re-set standing pins in its second descent in the cycle.

If the deck is to descend to a setting position, mechanism is provided to prevent engagement of the hook member 304 with the pin 113 and comprises an arm 319 fixed to shaft 309 which by a bar 320 is connected to a blocking member 321 pivoted on a pin 322 extending outwardly from a mounting plate 323 fastened to the gear box housing 164. The blocking member 321 has an arm 324 which normally oscillates back and forth about pin 322 in response to following movement of roller 311 on cam 312, but when a catch 325 moves up into alignment with the arm 324, movement of this arm is blocked which also blocks the movement of the bell crank arm 310 so that the follower roller 311 cannot move in on the low of cam 312 and thus the hook member 304 is maintained out of engagement with the pin 113.

The lengths of the slotted link 114 and hook member 304 are so designed that at the top of the crank stroke the weight of the pin deck I will always be held by the slotted link with clearance enough for hook member 304 to swing in and out of engagement with pin 113.

As described previously, the pin deck I has pin pickup mechanism and pin setting mechanism including an upper setting deck 62 both of which are operated in response to the movement of cables 87 and 76, respectively. The cable 76 has its upper end fixed to the pulley 79 which rotates with a second pulley 329 (Fig. 5) on the shaft 79a and which has a cable 330 fastened at one end thereto, and the other end of the cable is secured to a bracket 331 fixed to the frame support shaft 99. A pulley 332 is disposed within the loop of the cable 330 and is rotatably mounted on an arm 333 which is pivotally mounted on the pin 314 and which has integral therewith a follower arm 334 having a follower roller 335 which engages a cam 336 fixed to the shaft 176 and which has a blocking end 337. The cam 336 mounted on the shaft 176 is rotated one revolution in each machine cycle in a clockwise direction and has a slope beginning at 336a which permits the follower to move in on the cam under urging of the spring 80. In actual operation, the cam 336 has the first slope 336a which causes the upper setting deck 62 of the pin deck I to move rearwardly a portion of its total movement so as to drop the pins in the deck to an intermediate position and an additional slope 336b permits further inward movement of the follower roller 335 so that the upper setting deck 62 moves rearwardly an additional distance to cause setting of pins.

The cam 336 also determines the operation of the pin pickup mechanism on the pin deck I. A follower arm 340 is rotatably mounted on a stub shaft 341 mounted on a plate 342 secured on the gear box housing 164 by connecting brackets 343 (Fig. 3) and has a follower roller 344 which engages the cam 336 at a position approximately 90° behind the setting deck follower roller 335. An arm 340a integral with arm 340 connects with a downwardly-extending link 345 by means of a pin 346, and the link 345 has a slot 347 at its lower end which slidably receives a pin 348 on an arm 349 which is integral with the sleeve 89 in front of pulley 329 to which the cable 87 is attached. A tension spring 350 extends between the pins 346 and 348 so as to draw the pin 348 up in the slot 347 if the closing movement of the scissors type pin pickup mechanism should be blocked so that any slack in the cable 87 will be prevented.

Prior to starting of the machine, the cam 336 and follower rollers 335 and 344 are positioned as shown in Fig. 5, and the high portion of cam 336 maintains the follower rollers in approximately the same position for the first 90° of machine cycle at which time the pin deck I is at the bottom of its detecting stroke so that, if there are no pins present on the alley bed which would be the "strike" condition, a flag member 351 rotatable about a shaft 352 may be positioned to permit operation of the follower 334 for controlling movement of the upper setting deck 62 or the follower 344 for the pin pickup mechanism, but not both. In normal operation, when the machine operates through 90° of its cycle, the flag member 351 is positioned with a blocking surface 353 in alignment with the blocking end 337 of the follower 334 to prevent the cam follower roller 335 to follow the cam 336 while a second blocking end 354 of the flag member is clear of a blocking end 355 on the follower arm 340 so that the cam follower for causing operation of the pin pickup mechanism may follow the cam 336. If a strike has occurred, a link 356 connected to the flag member 351 by a pin 357 is moved forwardly of the machine so as to move the blocking surface 353 to a non-blocking position and move the blocking surface 354 to a blocking position which prevents operation of the pin pickup mechanism and permits operation of the upper setting deck 62 so as to set pins at the correct time in the machine cycle.

It should be noted that the cam 336 is connected to the shaft 176 which rotates one revolution in a cycle so that the cam is shaped to correctly control the time at which the pickup mechanism engages pins and releases pins.

It is not necessary that the follower 344 utilize the additional slope 336b on the cam so that a stop 358 on the frame is positioned to engage the blocking end 355 on the follower arm 340 when the lowest part of the cam slope or dwell is opposite the follower roller 344.

The raising and lowering of the rake board 117 with respect to the alley bed is caused by cam and cam follower mechanisms which connect to the link 128, previously referred to. The link 128 at its rear end is connected by a pin 358a to a cam follower arm 359 which is pivoted on a pin 360 supported by spaced ears one of them being shown at 361 extending rearwardly from frame support rod 100. Follower arm 359 has a cam follower roller 362 (Fig. 3) positioned for engagement with a cam 363 which is mounted on a shaft 176. The follower roller 362 is urged to follow the cam by the weight of the rake board 117 and also by a pair of springs 364 (Fig. 1) connected between the bell crank 126 and a bracket 365 connected to the rake support arms 115.

A second cam follower arm 366 is pivotally mounted on the cam follower arm 359 by a pin 367 and has a cam follower roller 368 which follows a cam 369 fixed to the shaft 176. The cam follower 366 is urged to follow its cam by a spring 370 which connects to a pin 371 on a part of the follower arm 366 and a pin 372 on a latch lever 373 fixed to a rotatable shaft 374 carried on the follower arm 359.

The latch lever 373 is urged into latching position with a latch block 375 carried on the follower arm 366 by the spring 370 and the position of the latch lever 373 is determined by a follower arm 376 (Fig. 5) fixed to the shaft 374 and having a follower roller 377 engageable with a cam lever 378.

The cams 363 and 369 have generally the same contours except that the cam 369 has its low beginning approximately 90° of machine cycle subsequent to the low on cam 363. After the rolling of a first ball in a frame, the latch lever 373 will be out of engagement with the latch block 375 so that the cam follower arm 359 is in control of the rake board 117 and when the machine commences operating, the follower 362 will follow the cam 363 and start down below on the cam low to cause the rake board to move to guard position adjacent the alley bed and the low will continue until immediately prior to the end of the machine cycle when the follower roller will ride up on the high of the cam to raise the rake board. The foregoing is the normal operation after the rolling of a first ball in a frame.

If a strike is not made on a first ball of a frame so that the next machine cycle is after the rolling of a second ball in the same frame, the cam lever 378 will be lowered with resultant counterclockwise rotation of the follower arm 376 and the latch lever 373 which latches into engagement with the latch block 375. This operation occurs at approximately 270° of machine cycle when the machine is cycling after a first ball, as will be more fully described hereinafter. With the latch lever 373 engaged, the cam follower roller 368 in engagement with the cam 369 becomes controlling and will follow on the high of the latter cam beyond the 360° position of the machine and through an additional 90° of machine cycle as a part of the over-cycle previously referred to. The cam lever 378 will be raised during the cycling of the machine after the second ball has started the machine so that the rake follower mechanism will be set up with the cam follower 362 on the follower arm 359 again controlling.

As described previously, the vertical posts 108 extend upwardly from opposite sides of the deck and are connected to the upper drive arms 105 by pins 107. The pin 107 on the near side of the machine, looking at Fig. 1, is extended inwardly from its connection to the drive arm 105 a sufficient distance to permit selective engagement thereof by a deck holding hook 400 (Fig. 5) which extends rearwardly toward and has a sleeve portion rotatably mounted on a shaft 401 which is pivotally mounted in a pair of ears 402 extending upwardly at an angle from the frame support shaft 100. An arm 403 fixed to the hook has a pin 404 slidably mounted in a slot 405 in the forward end of a link 406. The rearward end of link 406 has a slot 407 which receives a pin 408 carried on an arm 409. The link 406 is tubular and has a spring 410 therein which extends between the pin 404 and a pin 411 secured on the internal wall of the link. The spring 410 functions to yieldably hold the pin 404 in the forward end of the slot 405 and against an end abutment 412 in the link 406 but permits movement of the pin 404 rearwardly in the slot without movement of the link 406 if the link should be held against movement by the pin 408.

An arm 413 also fixed to the hook 400 has a link construction connected thereto similar to that connected to arm 403 wherein a pin 414 on the arm 413 is slidably mounted in a slit 415 in a link 416 and the opposite end of the link has a slot 417 which receives a pin 418 carried on an arm 419. A spring 420 extends between the pin 414 and a pin 421 and holds the pin 414 in yieldable engagement with an abutment 422 in the forward end of the link 416. With the parts as shown in Fig. 5, the deck hold hook 400 is held out of engagement with the pin 107. However, rearward movement of the link 406 or forward movement of the link 416 will cause the hook 400 to swing into engagement with the pin 107. In normal operation, only one or the other of the links will be shifted and the movement of the arm 403 or 413 associated with the other link will only result in compression of the associated spring within the tubular link.

The mounting plates 323 and 342 (Fig. 3) have been previously referred to and reference should be made to a mounting plate 422 which is spaced from the plate 323 and which acts therewith to support the control center L therebetween.

The tubular sleeve 106 to which the upper drive arms 105 for the pin deck I are attached has an arm 425 (Fig. 7) fixed thereto which pivotally supports a collar 426 by a pin 427 and the collar is fixed to a connecting link or rod structure, indicated generally at 428, and, more particularly, to a tubular element 428a, which extends upwardly toward the control center L. The tubular element 428a is open ended and has discs 429 and 430 closing the ends thereof and slidably receiving a rod 431 which extends upwardly and is pinned to a detector disc 432 (Figs. 7A and 8) rotatably mounted on the hub of a cam 444 by a pin 433. The control rod 431 has laterally projecting pins 434, 435, 436, and 437 and the pins 434 and 435 may slide through and beyond the discs 429 and 430, respectively. A pair of plugs 438 and 439 are disposed within the tubular element 428a and slidably receive the rod 431 and a spring 440 surrounds the rod and extends between the plugs and tends to urge the plugs 438 and 439 into seated engagement with the discs 429 and 430.

A pair of fixed surfaces 441 and 442 secured on the gear box housing 164 slidably receive the rod above the tubular element 428a, and the surface 441 acts to engage the pin 436 and limit upward movement of the rod 431 while the surface 442 acts to engage the pin 437 and limit the downward movement of the rod.

In normal operation with the pin deck I in its uppermost position, the tubular element and rod will be as shown in Figs. 6 and 7 with the pin 436 in engagement with the stop surface 441 and the spring 440 compressed because plug 439 has been lowered with respect to the tubular element by the pin 435. The pin 435 may travel freely to either side of the disc 430 by suitable enlargement of the central opening in the disc.

When the deck descends to a position beneath the strike detecting position, the pin 437 on the rod 431 engages the stop surface 442 to stop the movement of the rod while the tubular element 428a continues to move and causes the pin 434 to pass through the disc 429 into engagement with the plug 438 and compress the spring 440. It will thus be seen that the foregoing mechanism provides an over-travel mechanism which permits unitary movement of the tubular element 428a and the rod 431 between the limits defined by the pins 436 and 437.

The control center L is constituted by latch and lever mechanisms disposed around the shaft 181 which extends outwardly from the gear box housing 164 or toward the bottom of Fig. 3 and various cams keyed to said shaft as well as the detector disc 432 referred to above.

The detector disc 432, as shown in Figs. 7A and 8, is rotatably mounted on the hub of a detector cam 444 which is keyed to the shaft 181 and a re-set cam 449 is keyed to the shaft 181 adjacent the opposite side of cam 444.

The detector disc 432 has two series of notches on its periphery. One set of notches are at the face of the disc which is adjacent to the cams 444 and 449 while the notches at the other face are adjacent to cams to be described hereinafter. The first referred-to series or set of notches include notches 450, 451 and 452 (Fig. 7A). The notches 450 and 451 have a masking section 453 therebetween formed by the connecting periphery of the detector disc and the notches and masking section operate in conjunction with a "new set" latch lever 454 which is pivotally mounted on a shaft 455 extending between the plates 323 and 422 fastened to the gear box housing 164. A "new set" latch 458 is associated with the "new set" latch lever 454 and is also rotatably mounted on the shaft 455. Extensions 459 and 460 of the latch lever 454 and the latch 458, respectively, extend to opposite sides of the shaft 181 and are held in normally abutting relation at 461 by a spring 462. A tension spring 463 extends between a pin 464 on the extension 459 and a pin 465 fixed to the support plate 323 to urge the latch lever toward the shaft 181. The latch lever has a cam follower nose 466 at its end which is positioned for selective engagement with the associated cam 444 having a dwell 444a (Fig. 12) and a disc follower lug 467 projecting outwardly into the plane of the detector disc.

A "new set" lever 470 is pinned to a shaft 471 rotatably mounted in and extending between the plates 323 and 422 and extending outwardly beyond the plate 422. The arm 240a previously referred to in connection with the control of the clutch and which is connected to the link 239 is an extension of the "new set" lever 470 extending oppositely from the shaft 471. The "new set" lever has a cam follower roller 472 selectively engageable with the cam 449 (Figs. 11 and 12) having a "high" 449a extending over slightly less than one quadrant of the cam and the lever is urged toward a following position by a spring 473 surrounding a rod 474 which is connected at one end to the arm 240a by a pin 475 and which is slidably mounted at its other end in an opening formed in an arm 476. The spring abuts against the arms 240a and 476 to urge the "new set" lever 470 in a counterclockwise direction looking at Fig. 7A. The latch 458 when in its latch position engages a latch lug 477 extending laterally outward toward the plane of the detector disc 432 so as to lie in the plane of the latch 458.

The catch 325 previously referred to in describing the operation of the deck hook 304 is pivotally mounted on the shaft 471 outwardly of the arm 240a and has a spring 480 extending between connections 481 and 482 on the "new set" lever 470 and the catch 325, respectively. The catch 325 has an arm 483 integral therewith provided with an inwardly-extending lug 484 lying in the plane of the arm 240a which limits the movement of the catch by the spring 480. An arm 485 positioned outwardly of the plate 422 is fastened to the shaft 471 and abuts at 486 an arm 487 loosely mounted on the shaft 471 which has the link 356 connected thereto by a pin 488. The arm 356 has been previously referred to in the description of the flag member 351 which controls the operation of the cam followers for the pinsetting and resetting mechanism on the deck I.

In describing the parts of the control mechanism 163, the expression "outwardly" is considered to mean the direction toward the side of the machine from which the machine is viewed in Fig. 1 and which appears at the bottom of Figs. 2 and 3 while the expression "inwardly" when speaking of the direction in which a parts extends is meant to refer to the opposite direction.

A two-ball frame latch lever 490 is rotatably mounted on a shaft 491 extending between the plates 323 and 422 outwardly of the latch 458 and "new set" lever 470 and an associated latch 492 is also rotatably mounted on the shaft 491. Extensions 493 and 494 of the latch lever 490 and latch 492, respectively, abut at 495 and are yieldably held in abutting relation by a spring 496. A spring 497 connected between pins 498 and 499 on the extension 493 and frame plate 323, respectively, urges the latch lever 490 in a clockwise direction looking at Fig. 7A about the shaft 491. A follower lug 500 at the end of the latch lever 490 and extending outwardly therefrom follows the detector disc 432 and particularly the portion thereof containing the notch 452 and a follower nose 501 follows the cam 444 (Fig. 11) having the dwell 444a referred to previously.

A two-ball frame lever 502 is fixed to a shaft 503 rotatably mounted in the plates 323 and 422 and extending outwardly from the plate 323. The lever 502 has a cam follower roller 503a which selectively follows the cam 449 and has an outwardly projecting latch lug 504 lying in the plane of the latch 492 so that the lever 502 may be latched when the latch is in latch position.

The arm 275 previously referred to in connection with the over-cycling of the clutch 159, arm 409 referred to in the operation of the deck hold hook 400, and the cam lever 378 for latch 373 are fastened to the shaft 503 so that movement of the lever 502 results in movement of the arms 275 and 409.

The cam lever 378 (Figs. 5 and 12) is fixed to the shaft 503 outwardly of the plate 422 (Fig. 3) so that it lies in the plane of the follower roller 377. The arm 476 is also fastened to the shaft 503 so that it moves with the lever 502 and the spring 473 acting against the arm 476 urges the lever 502 in a clockwise direction looking at Fig. 7A toward the cam 449. The arm 409 carries an abutment 505 which is selectively engageable with an actuating member 506 (Fig. 12) of a switch 507 mounted on the frame. When the abutment 505 is out of engagement with the member 506, the switch may be connected to mechanism to indicate that the machine is set up for a first ball in a frame and, when the abutment 505 shifts the member 506, the switch 507 indicates that the machine is set up for a second ball in a frame.

As shown in Fig. 6, the link 155 which controls the rake sweep latch 145 is connected to a forked arm 510 by a pin 511. The arm 510 is integral with the arm 419 previously referred to in connection with the operation of the deck hold hook 400 and is also integral with a rake control lever 512 all of which are pivotally mounted on a shaft 513 extended between the mounting plates 323 and 422. The lever 512 has a cam follower roller 513 which follows a cam 514 (Fig. 6A) which is keyed to the shaft 181. The cam 514 has a relatively short low area 514a and a longer low area 514b. The lever 512 is urged into following relation with the cam 514 by a spring 515 mounted between the pin 511 and a pin (not shown) on the frame.

The cam lows 514a and 514b function to permit the lever 512 to move in toward the cam which results in clockwise movement of the arm 510 looking at Fig. 6 which results in forward movement of the link 155 to shift the latch 145 under the urging of spring 148 into position to engage the catch member 144 carried on the grab member 143. The low 514a is designed to have the lever 512 in its innermost position so that the link 416 for operating the deck hold hook 400 will be in its rearward position and thus hold the deck hold hook 400 out of engagement with the pin 107 on the deck vertical post 108. The rake latch 145 (Fig. 4) does not engage catch member 144 since the grab member 143 is not adjacent the latch during this portion of the cycle. The low 514b is arranged so as to permit the lever 512 to be in its inner position from approximately 135° to 225° of machine cycle so that during this interval the latch 145 may engage the catch member 144 which is moved into latching range at 135° of machine cycle by the crank 156 on the shaft 158 which makes four revolutions in a cycle and to maintain the latch until the catch member 144 again returns to its forward position at approximately 225° machine cycle. This interval is timed to occur between descents of the pin deck I in picking up and resetting or setting pins.

A detector cam 518 (Figs. 6A, 15 and 16) having the lows 518a and 518b is keyed to the shaft 181 immediately inward of the cam 514, and the detector disc 432 inwardly of cam 518 has notches 519 and 520 in the periphery thereof and at the side of the periphery adjacent the cam 518.

A latch lever 521 pivotally mounted on the shaft 455 and outwardly of the "new set" latch lever 454 has a nose 522 which follows the cam 518 and an inwardly-directed detector lug 523 which follows the detector disc 432. An arm 524 (Fig. 6A) integral with the arm 521 carries a pivot pin 525 which pivotally supports a bell crank having arms 526 and 527 and a second bell crank having arms 528 and 529. A spring 530 connected between a pin 531 on the plate 456 and a pin 532 on the arm 526 normally urges the detector lever 521 in a clockwise direction looking at Fig. 6 and holds abutments on arms 524 and 526 in engagement as indicated at 533. The arms 527 and 528 are held in abutting relation at 534 by a spring 535 connected therebetween. A link 536 connects the pin 532 on the arm 526 with an arm 537 of a bell crank pivotally mounted on a shaft 538 extending between the mounting plates 456 and 457 and the other arm 539 connects to a link 540 (Fig. 6) extending rearwardly. The link 540 has a slot 541 in which a pin 542 on a lever 543 is mounted. The arm 543 constitutes an additional arm of the multi-arm lever having the stop arm 220 and arms 222, 225, and 231.

A pin 544 on the inner face of cam 514 is positioned to engage the arm 529 after the shaft 181 has rotated through approximately a quarter revolution or 90° of machine cycle so as to be selectively engageable with the arm 529 when the detector lever 521 is in its furthest counterclockwise position which places the arm 529 in the path of the pin 544. When this occurs, the arm 526 pulls down on the link 536 to shift the link 540 forwardly and pull the stop arm 220 up into position under the clutch follower roller 219 so that at 90° of machine cycle the cam 208 on shaft 158 will operate to disengage the clutch and the movement of stop arm 220 results in clockwise movement of the arm 231 which pulls the trigger link 234 downwardly to position the trigger 243 under the pin 241 under the urging of spring 246. This operation occurs when the pin deck I lands on the standing pins which are out of pin pickup range and thus are contacted by the bottom plate on the pin deck having the openings through which pins normally extend when in pin pickup range.

In order to re-start the machine, an operator at the rear of the machine may pull on a rod 545 connected to a link 546 having a slot 547 slidably engageable with a pin 548 on an arm 549 integral with the arm 250 which is connected to the trigger 243 by the link 251 so that the trigger 243 is pulled out from under the pin 241 similarly to the action that occurs when a ball hits the pit cushion K which also pulls the pin 511 by its connection thereto to pull the link 155 rearwardly and hold the latch 145 out from engagement with the catch member 144 so that sweeping of deadwood into the pit will not occur. This also results in moving the arm 419 in a counterclockwise direction about its pivot 471 so that the link 416 is shifted forwardly to position the deck hold hook 400 to engage the pin 107 and hold the deck up so that the deck will not go down again in the second half of the machine cycle. The member 545 need not be held until the machine stops since a latch 549a (Fig. 4) pivoted on an arm 549b integral with the sleeve 154 is moved into engagement with a latch pin 549c extending through rod 102. When the rake J ascends at the end of a cycle, the arm 127 disengages the latch 549a from the latch pin. This results in maintaining the hold hook 400 in position to maintain the deck in up position and prevent its descending again onto the tops of standing pins.

The notches 519 and 520 are so arranged that the detector lug 523 may move into one of the notches except when the lowering movement of the deck terminates at a level determined by a standing pin which is out of the pin pickup range.

In a modified form of the too-far-off-spot mechanism as shown in Figs. 15, 16 and 17, the machine is not stopped but the rake board 117 is prevented from sweeping movement to prevent sweeping and the deck is held up by the hook 400 until the machine stops at the end of its normal cycle. In this modification, the arms 510 and 512 are identical as is the construction of the detector disc and the cams 514 and 518. The construction of arm 521 is also the same and the foregoing parts have been given similar reference numerals. Fig. 15 illustrates the parts in their position when the deck I lands on a "too-far-off-spot" pin while Fig. 17 illustrates the parts when the deck is down and does not find a "too-far-off-spot" pin. Fig. 16 illustrates the parts when the deck is down at 270° of machine cycle and wherein the cam 518 holds the detector lever nose 522 out so that the detector lever may not move.

The detector lever 521 has an extension 550 which is held in abutting relation with an extension 551 of a latch 552 pivoted on the shaft 455 by a spring 554 extended between the extensions. A spring 555 connected between a pin 555a on the frame plate 422 and a pin 556 on the extension 550 urges the lever 521 toward the detector disc 432.

As described previously, the detector lug 523 may move into a notch except when the deck lands on one or more pins too far out of pickup range so that with the detector lug 523 held out, the latch 552 holds the lever 512 in its outer position by engagement of an inwardly-extending latch lug 557 with the latch and in this position, the rake latch 145 may not engage the catch member 144 and the deck hold hook 400 is positioned to engage the pin 107 when the deck returns to its upper position. The detector lug is shown in the notch 520 when the pin deck I finds no pin "too-far-off-spot" in Fig. 17 and the detector lug is held out, as shown in Fig. 15, when the deck finds a "too-far-off-spot" pin.

A foul ball solenoid 560 is connected to a bell crank having an arm 561 by a spring 562 (Figs. 7A, 18 and 19). The bell crank is rotatably mounted on the shaft 455 and has another arm with an outwardly bent end 563 which engages with an arm 564 of a bell crank rotatably mounted on the shaft 455 and outwardly of the bell crank arms 561 and 563. Another arm 565 of the bell crank having the arm 564 is positioned to engage an outwardly extending projection 566 on a lever 567 rotatably mounted on the shaft 455 inwardly of the two bell cranks previously referred to. A spring 568 extends between the projection 566 and the pin 499 extending from the plate 323 to urge the interengaging parts in a clockwise direction looking at Fig. 18 against a pin 570 extending outwardly from the plate 323.

The arm 564 has a nose 571 lying in the plane of a partial ring 572 on the cam 449.

The projection 566 extends outwardly a sufficient distance to line up with an arm 573 fastened on a sleeve 573a loosely mounted on a shaft 574 extending between the plates 323 and 422 and also to engage an abutment 574a formed on the extension 460 of the "new set" latch 458. An arm 575 connected to the arm 573 by the sleeve 573a on the shaft 574 lies in the plane of the extension 551 of the latch 552 in the rake control mechanism in the modification of Figs. 15, 16 and 17, and is connected thereto by a pin 577.

A pin 578 (Fig. 18) on the "new set" latch 458 is positioned for selective engagement with the two-ball frame latch 492.

In operation, the solenoid 560 is operated by a foul line indicator (not shown) in which the indicator has a holding circuit timed to hold the solenoid energized until the impact of a ball against the pit cushion K starts the machine. Due to the timing, someone's crossing the foul line without actually rolling a ball will not cause a foul cycle.

As the solenoid 560 is energized and the machine started by a ball hitting the pit cushion K, the initial portion of the partial cam ring 572 on the cam 449 engages the nose 571 on the arm 564 which has been previously positioned in the path of the partial ring by energization of the solenoid which moves arms 561 and 563, and arm 564 in a counterclockwise direction. The engagement of the cam ring 572 with the nose 571 pivots the arms a further amount in a counterclockwise direction to carry the projection 566 into engagement with the abutment 574a and pivot the latch 458 in a counterclockwise direction against the action of spring 462 a sufficient distance to release "new set" lever 470 and when the detector cam 449 presents its low adjacent the follower roller 472 on the "new set" lever, the "new set" lever may move in to set up the flag 351 so that the upper setting deck 62 may operate with the pin pickup mechanism blocked at the desired time in the machine cycle.

At the same time, the projection 566 hits the arm 573 to move the latch 551 in the modified rake control mechanism so as to permit movement of the rake control lever 512 so that the rake will sweep at its normal time in the machine cycle, it being noted that this latter operation is only necessary in the modified form of too-far-off-spot pin control where the rake is stopped while the machine continues to cycle.

Further rotation of the cam 449 causes a rising slope on the cam ring 572 to raise the "new set" latch 458 an additional distance so that the projection 578 engages the under surface of latch 492 to pivot this latch and release the two-ball frame lever 502 which sets up the machine to await the rolling of a second ball in a frame.

If a foul occurs upon the rolling of a second ball in a frame, there will be no operation of the foul mechanism since it will be remembered that as the machine was set up for the second ball, the two-ball frame member 502 had rotated clockwise with its latching lug 504 in position to intercept the counterclockwise rotation of arm 563 if the foul ball solenoid should be energized. With the arm 563 blocked, the nose 571 cannot move into position to engage the partial cam ring 572 so that no change is made in the normal sequence of the machine and in this instance the spring 562 takes up the motion of the solenoid.

At certain times, it is desired to set a "new set" of pins on the alley, for example, when a bowler obtains a spare in the tenth frame, he is entitled to one additional ball and, after the rolling of this ball, it is necessary to place a "new set" of pins on the alley. A solenoid 580 (Figs. 7A) connected on the frame plate 422 is connected by a link 581 to the arm 248 in the clutch control mechanism so that energization of the solenoid pulls the link 581 forwardly and as a result, releases the trigger 243 to start the machine in operation. The link 581 is slotted at 582 to receive a pin 583 on the extension 494 of the two-ball frame latch 492 and energization of the solenoid rotates the two-ball frame latch 492 in a clockwise direction against the urging of spring 496 to release the two-ball frame lever 502 which moves inwardly on cam 449 about its pivot shaft 503 at the appropriate time. As previously described, this moves the deck hold hook 400 into position to temporarily hold the deck in its upper position and as previously described, the "new set" lever 470 will move inwardly at approximately 90° of machine cycle so that pins on the alley are raked off, new pins are set, and the mechanism returns readily for a first ball in a frame.

The circuit as shown in Fig. 9 includes the main lines 600 and 601 which have a connection 602 to a normal 110 volt, 60 cycle circuit. The motors 12 and 40 are connected across the lines 600 and 601 by wires 603 and 604, respectively. The motors are electromagnetically started by energization of a coil C connected across the lines by a wire 605. The coil C has normally open switches $C_1$ and $C_2$ connected in the wires 603 and 604, respectively, and normally open switch $C_3$ connected in the wire 605.

The coil C may be energized to start the motors by closing a switch 606, a switch 607 or a switch 608 connected in parallel with the normally open switch $C_3$ and the coil may be de-energized to stop the motors by opening of any of switches 609, 610 or 611 connected in the wire 605.

The switches 606 and 609 may be located at a control desk at the front of a bowling alley, the contacts 607 and 610 may be located adjacent the masking unit of the machine and the contacts 608 and 611 may be located at the rear of the machine.

A wire 612 has the switch 507 having a contact 613 which is connected in a wire 614 having a first ball light $L_1$ and another contact 615 connected in a wire 616 having a second ball light $L_2$. A wire 617 has a switch 618 provided with the normally open switch member 619 which, when closed, may energize a coil 620 for operating a counter (not shown) to indicate the number of times the pin deck I descends to set pins on the alley bed. The switch 618 may be located for operation by the "new set" lever 470 or may be mounted on the frame for engagement by the pin deck I when it descends to its setting level.

A wire 621 has the "new set" solenoid 580 and a pair of normally open switches 622 and 623 connected in parallel. The contact 622 may be located at the rear of the machine and the contact 623 located at the front of the alley for use by a bowler when a new set of pins is required.

A wire 624 has a commercially available foul detector unit 625 connected therein which energizes a wire 626 having the foul solenoid 560 and maintains the solenoid energized a length of time sufficient to enable a ball to hit the pit cushion K and start the operation of the machine. As mentioned previously, energization of the solenoid 560 has no effect on the cycling of the machine if the foul line should be inadvertently crossed since the proper operation of the foul mechanism requires that a ball subsequently engage the pit cushion K.

*Operation*

As shown in Figs. 1 to 7A, the machine is set up awaiting the rolling of a first ball in a frame. The impact of the ball swings the pit cushion K clockwise about the pivotal connection of the arms 136 to the plates 132, and the arm 139 extending upwardly from the pit cushion shifts the link 140 to pull the trigger 243 and release the trigger link 234 so that the clutch 159 may engage to drive the input shaft 165. The rotation of the input shaft 165 starts the shafts 158, 173, 176 and 181 rotating in a 4-2-1-1 ratio, respectively.

At the start of the first ball cycle, the "new set" lever 470 is held out by the "new set" latch 458 so that the catch 325 is out of alignment with the arm 324 leaving the follower arm 310 free for movement so that the cam follower roller 311 may follow the cam 312 on the shaft 173. Thus, the deck lift hook 304 drops into engagement with the pin 113 on the deck lift shaft 106 so that the deck I travels through a detecting stroke of a sufficient distance to detect the presence or absence of standing pins and to pick up any pins that may be standing. Referring to the diagram shown in Fig. 20, the line F—F denotes the path of the pin deck I with the deck at the bottom of its detecting stroke at 90° of machine cycle.

The downward motion of the pin deck I will result in movement of the detector link 428 and rotation of the detector disc 432. The bottom level of the deck will result in corresponding positioning of the detector disc.

Firstly, considering the situation wherein pins remain standing, as shown diagrammatically in Fig. 11 the "new set" detector lever 454 finds no notch in the detector disc but is held out by the masking section 453 so that the nose portion 466 of the lever cannot follow its cam 444 onto the low 444a (Fig. 20). This results in holding the latch 458 engaged with the "new set" lever 470 and with the "new set" lever held the flag member 351 remains in its initial position so that the blocking surface 353 blocks the blocking end 337 of the follower arm 334 to prevent motion of the upper setting deck 62 but motion of cam follower arm 340 to permit closing of the scissors is not prevented. This relationship is shown in Figs. 5 and 10. At the same time, the arm 512 moves in against its cam 514 and, more particularly, the low portion 514a of the cam (Fig. 20) so that the lever 512 rotates clockwise to draw the link 155 rearwardly and position the latch 145 so that it will pick up the catch member 144 as the latter member moves to its forward position and result in moving the rake board 117 along the alley bed to sweep the dead wood into the alley pit. The cycling of the crank 156 is illustrated in Fig. 20 and shows a forward position at 130° of machine cycle where the latch 145 may engage. Also, the link 416 is moved rearwardly to raise the deck hold hook 400 away from the position wherein it would engage the pin 107 on the deck support arm.

The rake board 117 is dropped to the alley bed immediately after starting of the machine (Fig. 20) by following movement of the arm 359 and cam follower 362 on the cam 363 which results in shifting the link 128 rearwardly so that the arm 127 is rotated in a clockwise direction and through the bell crank 126 lowers the links 125 with resultant lowering movement of the rake board 117.

The pin deck I is brought to the top position with the pins held in the closed pin pickup mechanisms high enough to clear the rake as it sweeps the dead wood to the pit. At this time, the pin deck is supported by the slotted link 114 and the deck lifting hook 304 is caused to go through an idle motion off the pin 113 and on again by the cam 312 (Fig. 20). With the lifting hook 304 re-engaged and the deck holding hook 400 out of engagement with the pin 107, the deck returns at approximately 270° of machine cycle to re-set the standing pins in the positions from which they were taken as the cam follower roller 344 moves out of the dwell area of cam 336 and back onto the high portion thereof (Fig. 20).

As the deck approaches the re-spotting position, a second detecting cycle takes place as indicated diagrammatically in Fig. 12. The "new set" latch lever 454 engages the high of its cam 444 and is also on masking section 453 so that it cannot move. The rake control lever 512 is moved outwardly by a high on the cam 514 so that the latch 145 is out of engagement with the catch member 144 and the link 416 is shifted forwardly to a position the deck hold hook 400 in position to engage the pin 107 on the deck support arm when the pin deck rises to its top position.

When re-spotting pins as shown in Fig. 12, the two ball frame latch lever 490 encounters a notch 452 in the detector disc 432 allowing the latch lever 490 to follow its cam 444 inwardly onto the low 444a (Fig. 20) so as to withdraw the latch 492 from engagement with the two-ball frame lever 502. The lever 502 is urged to follow the down slope of its cam 449 by the spring 473 which withdraws pressure on the deck hold hook link 406 and releases the plunger of switch 507 to change the first ball light to the second ball light because the shifting of the two ball frame lever indicates that the machine will be set up to await the rolling of a second ball in a frame. Also, through arm 275 and rod 276, the latch 267 is shifted to disengage from the pin 266 so that the reset arm 242 is moved under the control of cam 262 rather than cam 271 and the clutch remains engaged until 90° of the second machine cycle.

This same movement of the two-ball frame lever 502 causes the cam lever 378 to drop and permit latch 373 to engage the latch block 375 under the urging of springs 370 so that the follower arm 366 and its follower 368 become controlling and although the rake 117 rises at the normal end of the machine cycle, the rake stays up when the machine starts after the rolling of a second ball until just after 90° of normal machine cycle because the low on cam 369 begins 90° after the low on cam 363 (Fig. 20).

The deck holding hook 400 is in engagement with the pin 107 on the deck support post 108 and holds the pin deck I up during the over cycling which is the normal time in which the deck descends for a detecting stroke. At the end of the over-cycling period, with the pin deck I held up by the deck hold hook 400, the detector link 428 is in its upper position, as shown in Fig. 13, so that the detector disc 432 has its notch 451 in alignment with the lug 467 on the "new set" latch lever 454 and the low 444a in cam 444 is opposite the nose 466 of the latch lever (this will be seen by looking at the 90° position on the diagram of Fig. 20) so that the latch 458 may be shifted to release the "new set" lever 470 to move inwardly on its cam 449 off the high 449a. This movement of the "new set" lever swings catch 325 into position to block movement of the arm 324 to prevent the movement of the deck lift hook 304 into engagement with the pin 113. This same movement of the "new set" lever shifts the flag 351 to block the action of the scissors operating follower arm 340 and permit movement of the setting deck follower arm 334. The arm 240a is also shifted which through the link 239 pulls the trigger link lower end 234 forwardly to free the pin 232 from the slot 233 in the trigger link so that positioning of this pin may be under the control of the connecting link 236.

Just prior to the end of the over-cycling period, the re-set arm 242 through the pin 241 and the trigger 243 rotates the stop arm 220 into position under the follower arm 218 in time for the cam 208 on the shaft 158 to disengage the clutch and stop the machine.

The rolling of a second ball and resulting movement of the pit cushion K thereby again starts operation of the machine as previously described with the movement of the deck as indicated by the line H—H in Fig. 20 wherein with the machine starting at the 90° position because of overcycling after the first ball, the deck remains up while sweeping of deadwood is carried out by the rake J and, subsequently to the 180° position on the diagram in Fig. 20, the deck moves down to a pinsetting position permitted by the slotted link 114 since the deck lift hook 304 has been held out by the blocking of the arm 324 by the catch 325. As part of the setting operation, the cam follower 335 for operating the upper setting deck 62 moves into the low area of the cam 336 which permits the spring 80 to operate to shift the setting deck 62. At this time the position of the control elements is shown in Fig. 14 and it will be noted that the high 449a of cam 449 has re-set the two-ball frame lever 502 behind the latch 492 so that the parts operated by the two-ball frame lever are again positioned as they were prior to the rolling of a first ball in a frame. Also, looking at Fig. 14, it will be noted that the new set detector lever 454 has been moved to its outermost position by the "high" of cam 444 which has been permitted by operating movement of the extensions 459 and 460 since the new set lever 470 is still on the low of cam 449.

As the pin deck I returns to its upper position, it will be noted that the high 449a of the cam 449 becomes operative to reset the new set lever 470 behind the latch 458.

As indicated in Fig. 20, the low of cam 369 begins subsequent to the time the machine commences operation after the rolling of a second ball so that the rake J immediately starts its descent to a guard position and remains there until near the end of the cycle when the high on cam 363 causes the rake to be lifted. The latter cam is again effective at the time that the two-ball frame lever 502 is shifted out to its latched position behind latch 492.

Assuming an alternative condition wherein after the rolling of a first ball the pin deck I descends under the control of the deck lift hook 304 and finds no standing pins, the control elements are positioned as shown in Fig. 11. The detector lug 467 on the detector lever 454 is adjacent the notch 450 in the detector disc 432 and the nose 466 of the detector lever is in the low 444a of the cam 444 (Fig. 20) so that the detector lever may pivot counterclockwise about its shaft 455, looking at Fig. 11, to release the latch 458 from engagement with the lug 477 on the new set lever 470 and the follower roller 472 on the new set lever may move off the high 449a of the cam 449 so that the new set lever pivots counterclockwise about its pivot 471. This causes the same shifting of parts as described previously and, in effect, shifts the flag member 351 to block the cam follower arm 340 for the scissors pin pickup mechanism and permit movement of the follower arm 334 for the upper setting deck 62. The movement also results in movement of the arm 240a to shift the trigger link 234 forwardly and release the pin 232 so that the control of the clutch will be determined by the availability of a set of pins for setting as indicated by the connecting link 236 (Fig. 6). Additionally, the catch 325 is positioned to engage the arm 324 and block the deck lift hook 304 from engagement with the pin 113 so that the next descent of the deck will be to the setting position under the control of the slotted link 114.

The line G—G in the diagram of Fig. 20 illustrates the movement of the deck as may occur after the rolling of a first ball and shows the first descent through the detecting stroke down to a position where the pin deck stops on standing pins and also shows the second descent where the deck re-sets standing pins.

The line H—H in the diagram in Fig. 20 shows the movement of the deck after the rolling of a second ball in a two-ball frame wherein the deck remains up until after the sweeping operation has been performed and then subsequently to a 180° position on the diagram of Fig. 20 descends a distance greater than that illustrated in line G—G to place a set of pins on the alley.

The right hand portion of line F—F in Fig. 20 is divided into two parts and the upper portion illustrates the descent of the deck in a re-setting operation while the lower portion illustrates the descent of the deck in a setting operation.

What we claim is:

1. In an automatic pinsetter for use on a bowling alley having an alley bed, in combination, a frame, a deck, a deck-operating shaft extending transversely of the frame and movably supported therein, a pair of arms extending forwardly from the deck-operating shaft and connected to the deck, a crank-driven slotted link, a pin connected to the deck-operating shaft and slidably mounted in said slotted link, a crank-driven hook member selectively engageable with said pin for imparting a shorter stroke to the deck, cam means for moving the hook member in or out of engagement with the pin when the deck is in its upper position, a pin pickup and pin-setting operating cam, a first cam follower engageable with said cam for controlling the pickup of pins, a second cam follower engageable with said cam for controlling the setting of pins, a second hook member selectively engageable with the deck to hold the deck in its upper position while the slotted link is idly driven, and means responsive to the level of the deck depending upon the presence or absence of standing pins after the rolling of a first ball in a frame to control the operation of the machine through a reset or new set cycle including a new set lever for blocking the first hook member so as to permit descent of the deck under control of the slotted link and to block the first cam follower and permit operation of the second cam follower, and a plural ball frame lever for causing overcycling of the machine at the end of the normal cycle upon the occurrence of standing pins and engagement of the second hook member with the deck to hold the deck up during the overcycling whereupon the machine will commence operating at an advanced point in its cycle upon rolling of a second ball in a frame.

2. In an automatic pinsetter for use on a bowling alley having an alley bed, in combination, a pin deck, a crank-driven slotted link, a pin connected to the deck and slidably mounted in said slotted link, a crank-driven hook member selectively engageable with said pin for imparting a shorter stroke to the deck, cam means for moving the hook in or out of engagement with the pin when the deck is in its upper position, a second hook member selectively engageable with the deck to hold the deck in its upper position while the slotted link is idly driven, and means responsive to the level of the deck depending upon the presence or absence of standing pins after the rolling of a ball to control the operation of the machine through a reset or new set cycle including a new set lever for blocking the first hook members so as to permit descent of the deck under control of the slotted link, and a plural ball frame lever for causing overcycling of the machine at the end of the normal cycle upon the occurrence of standing pins and engagement of the second hook member with the deck to hold the deck up during the overcycling whereby the machine will commence operating at an advanced point in its cycle upon rolling of a second ball in a frame.

3. In an automatic pinsetter for use on a bowling alley having an alley bed, in combination, a pin deck, a crank-driven slotted link, a pin connected to the deck and slidably mounted in said slotted link, a crank-driven hook member selectively engageable with said pin for imparting a shorter stroke to the deck, cam means for moving the hook member in and out of engagement with the pin when the deck is in its upper position, a pin pickup and pinsetting operating cam, a first cam follower engageable with said operating cam for controlling the pick-up of pins, a second cam follower engageable with said operating cam for controlling the setting of pins, and means responsive to the level of the deck depending upon the absence of standing pins after the rolling of a ball to control the operation of the machine through a new set cycle including a new set lever for blocking the hook member so as to permit descent of the deck under control of the slotted link and to block the first cam follower and permit operation of the second cam follower.

4. In an automatic pinsetter for use with a bowling alley having an alley bed, in combination, a frame, a deck supporting shaft movably mounted on said frame and extending transversely of the alley bed, a pin deck, arms fastened to said shaft for mounting the deck to the shaft for movement therewith, a detector disc, a first plural ball frame lever for causing operation of the deck through a two-ball operation, a second lever for causing operation of the deck through a cycle to set pins on the alley bed, a pair of latches positioned adjacent the disc, one associated with each of said levers, and a link connected to the shaft and detector disc to cause related movement between the deck and the detector disc whereby the disc has one position when pins are standing an another position when no pins are standing, and means on the detector disc for causing movement of one latch and the associated first lever when less than all pins are knocked down by the first ball in a frame and for causing release of the other latch and second lever when there are no standing pins after a first ball.

5. In an automatic pinsetter for use with a bowling alley having an alley bed, in combination, a frame, a pin deck, a detector disc, a first plural ball frame lever for causing operation of the deck through a two-ball operation, a second lever for causing operation of the deck through a cycle to set pins on the alley bed, a pair of latches positioned adjacent said disc and one associated with each of said levers, and a link connected between the deck and detector disc to cause related movement between the deck and the detector disc whereby the disc has one position when pins are standing and another position when no pins are standing, and means on the detector disc for permitting movement of one latch and the associated first lever when the deck descends to reset standing pins and for causing release of the other latch and lever when the deck descends to a level below that occurring when there are standing pins to cause setting of pins.

6. An automatic pinsetter comprising, in combination, a pin setting and resetting deck, means for moving the deck through a detecting stroke and a setting-resetting stroke after the first ball in a frame, and a control center having a control shaft, a control disc loosely mounted on said shaft for rotative movement, a control rod connected between the disc and deck for moving the disc in response to movement of the deck, a detecting cam keyed to said shaft, means for rotating said shaft one revolution a cycle wherein the deck goes through the detecting stroke and the setting-resetting stroke, a first plural ball frame lever, a new set lever, latches for said levers positioned adjacent said control disc, means on the control disc for permitting movement of the first lever latch when the deck descends to a level at the top of standing pins and for permitting movement of the new set lever latch when the deck descends and finds no pins standing, and means on the detecting cam for blocking movement of the first lever latch during the detecting stroke of the deck and for blocking movement of the new set lever latch in a setting stroke of the deck.

7. An automatic pinsetter comprising, in combination, a pin deck, means for moving the deck up and down through a detecting operation and a setting or resetting operation, and a control center having a rotatable control member moved by the deck as the deck moves up and down, a new set lever, a latch positioned adjacent the control member for holding the lever against movement, means on the control member masking said latch against movement as the deck moves between an upper position and its lowest detecting position, means on the control member permitting movement of the latch to release the lever when the deck reaches its lowest detecting position, and means operable in timed relation with the deck moving means for permitting movement of the latch in a detecting operation but not in a setting operation.

8. In an automatic pinsetter for use with a bowling alley, in combination, a pin deck, means for moving the deck toward and away from the alley through a detecting operation and a setting or resetting operation, and a control center positioned generally above the deck and having a rotatable control member moved by the deck as the deck moves up and down, a new set lever, a latch positioned adjacent the control member for holding the lever against movement, means on the control member masking said latch against movement as the deck moves between an upper position and its lowest detecting position, and means on the control member permitting movement of the latch to release the lever when the deck reaches its lowest detecting position.

9. An automatic pinsetter comprising, in combination, a pin deck, means for moving the deck up and down including a downward detecting stroke after the rolling of a first ball in a frame in which the lower portion of the downward stroke constitutes a detecting range of movement, a control member moved by the deck as the deck moves up and down, a new set lever, a latch holding the lever against movement, means timed with the deck movements for holding the latch against movement except when the deck is in detecting range, and means on the control member freeing the latch for movement to release the lever when the deck reaches its "strike" detecting position within the detecting range.

10. An automatic pinsetter comprising, in combination, a pin deck, means for moving the deck up and down including a detecting stroke having a lower limit beneath the tops of standing pins after the rolling of a first ball in a frame, a control member moved by the deck as the deck moves up and down, a new set lever, means connected to said lever for controlling the pin deck through a pin setting movement in response to movement of the lever, a latch holding the lever against movement, and means on the control member permitting movement of the latch to release the lever when the deck reaches a "strike" detecting position.

11. In an automatic pinsetter, in combination, a pin deck for setting and resetting pins, means for moving the deck up and down, means for controlling the operation of the pinsetter, including a shaft driven in timed relation with the deck moving means, a new set control lever, a two ball frame control lever, a plurality of movable latches for said levers and each having a cam follower, there being one latch associated with each lever, a control disc loosely mounted on said shaft and having notches for receiving said latches in certain positions thereof corresponding to the level of the deck, a link connecting the deck and disc, a detecting cam fixed to said shaft and operable with the cam followers on the latches associated with the control levers to permit movement of a latch into a notch at the appropriate interval in the machine cycle, and a cam fixed to the shaft to reset said control levers in engagement with their latches.

12. An automatic pinsetting machine for a bowling alley having a mechanical control comprising, a pinsetting and resetting deck movable to a position to detect the absence of standing pins, means for moving the deck toward and away from the alley, a new set lever for causing the machine to place a set of pins on an alley, control means including a rotatable disc, having a predetermined rotative position when standing pins are absent, a link connecting the deck and disc whereby the disc is in its predetermined position when the deck is in its detecting position, said control means being responsive to the detection by the deck of the absence of all standing pins after a first ball in a frame to shift the new set lever.

13. An automatic pinsetting machine having a mechanical control comprising, a pin deck, means for moving the deck through a detecting stroke, a new set lever for causing the machine to place a set of pins on an alley, a plural ball frame lever for causing the machine to set up for the rolling of a second ball in a frame including shifting of the new set lever, and control means including a member positioned by the level of the deck in a detecting stroke and responsive to the absence of all standing pins after a first ball in a frame to shift the new set lever, and responsive to the presence of standing pins to shift the plural ball frame lever.

14. An automatic pinsetting machine having a mechanical control comprising, a new set lever for causing the machine to place a set of pins on an alley and be set up awaiting the first ball of a frame, a plural ball frame lever for causing the machine to set up for the rolling of a second ball in a frame, means responsive to the absence of all standing pins after a first ball in a frame to shift the net set lever, means responsive to the presence of standing pins to shift the plural ball frame lever, and means responsive to setting up for the second ball operation to shift the new set lever to obtain a new set of pins on the alley after the rolling of a second ball.

15. An automatic pinsetter for use with a bowling alley comprising, in combination, a frame, a pin deck mounted on the frame for movement toward and away from an alley bed, a pin operatively connected to the deck, a slotted link slidably receiving said pin, a hook selectively engageable with said pin, crank means for imparting a throw to said link for moving the pin deck in a setting stroke and a shorter throw to said hook for moving the pin deck in a detecting stroke, and means for engaging the hook with the pin prior to deck descent after the rolling of a first ball of a frame to move the deck through a detecting stroke.

16. An automatic pinsetter, as defined in claim 15, wherein the hook engaging means comprises, a cam follower, link means connected between the follower and the hook means for causing the hook to move with the cam follower, a cam rotated through two revolutions in each cycle wherein the deck makes two descents and having a low which causes the hook to move into engagement with said pin at the beginning of each deck descent, and means for blocking pin engaging movement of the cam follower and hook when the deck is to descend to setting position.

17. In an automatic pinsetter for use with a bowling alley, in combination, a pin deck having a setting level with respect to an alley bed and a higher pin pickup level, a slotted link and pin mechanism for causing raising movement of the deck and permitting lowering movement of the deck between an extreme upper position and said setting level, a driven movable hook member selectively engageable with said pin and operable when engaged with said pin to modify the lowest position of the deck to one slightly beneath the tops of standing pins and above the setting level so that the deck moves through a detecting stroke, and means for causing engagement of the hook with the pin prior to the first descent of the deck after the rolling of the first ball in a frame in order to move the deck through a detecting stroke.

18. In an automatic pinsetter, in combination, a frame, a deck, a first shaft extending transversely of and movably mounted in the frame, a pair of support arms fixed to the shaft and extending forwardly to the deck, a slotted link extending downwardly adjacent said shaft, a pin connecting the link and shaft slidably mounted in said slotted link, means for driving the link to raise and lower the deck through a stroke sufficient to place the deck adjacent the alley bed to set pins, and means for imparting a shorter length of stroke to the deck including a crank driven hook selectively engageable with said pin, and means for engaging the hook with the pin when the deck is to move to detect for and reset standing pins.

19. In an automatic pinsetter for use with a bowling alley having a pit, in combination, a pin deck, and means for controlling the operation of the machine including a control member at a control center, a link connected between the deck and control member to cause positioning of the member corresponding to the level of the deck, means for moving the deck through a setting stroke from its top position to a setting level, and means for moving the deck through a detecting stroke wherein the deck may stop at a first level where at least one standing pin is encountered and a second "strike" level where no standing pins are encountered, and means responsive to positioning of the control member when the deck stops at the first detecting level to pickup and reset pins and when the deck stops at the second level to set new pins.

20. An automatic pinsetter comprising, in combination, a pin deck for setting or resetting pins, a shaft operable through one revolution in a cycle wherein the deck descends in a detecting stroke having a strike-detecting level below its level when it finds standing pins and a subsequent setting or resetting stroke, means for lowering the deck through said strokes and raising the deck, a new set lever operable when shifted from a normal position to effect setting of pins, a latch adjacent said shaft for holding the lever in normal position, a control member loosely mounted on said shaft and having a notch for receiving the latch, a link connected between the deck and member for aligning the notch with the latch when the deck is in its top position and in its strike detecting position so that movement of the latch releases the lever, a cam follower on said latch, and a detector cam fixed to said shaft and having a low which permits the follower to move in when the machine has cycled to the point when the deck is ordinarily at the strike-detecting level.

21. An automatic pinsetter as defined in claim 20, having means for holding the deck in its top position when the machine cycles through to the point when the deck is ordinarily at the strike detecting level after the rolling of a first ball in a two-ball frame so that latch movement is permitted by the detector cam and the lever shifts to set up for a new set of pins on an alley after rolling of the last ball in a frame.

22. An automatic pinsetter comprising, in combination, a pin deck for setting or resetting pins, a shaft at a control center operable through one revolution in a cycle wherein the deck moves through a detecting and pin pickup sequence with the deck having a strike detecting level below its level when it finds standing pins and a subsequent setting or resetting sequence, means for moving the deck through said sequences from a top position, a new set lever operable when shifted from a normal position to effect setting of pins, a spring urging the lever from normal position, a latch adjacent said shaft for holding the lever in normal position, a control member loosely mounted on said shaft and having a notch for receiving the latch, a spring urging the latch toward the member, a link connected between the deck and member for aligning the notch with the latch when the deck is in its strike detecting position so that movement of the latch releases the lever.

23. In an automatic pinsetter, a pin deck, means for moving the deck between a top position and a pin setting position, means for modifying the movement of the deck in a detecting stroke after the first ball of a frame so that the lowest level is above the setting position and below the tops of standing pins, mechanical control means for controlling the movements of the deck including a control disc positionable in correspondence to the level of the deck so as to indicate the presence or absence of pins, and a control rod operatively connected between the deck and the disc for causing related movement of the disc and deck.

24. In an automatic pinsetter, a pin deck for setting or resetting pins, means for moving the deck through a detecting stroke having a "strike" detecting level below the level of the deck when it finds standing pins, means for causing either the setting or resetting pins including a movable control member, a shaft driven in timed relation to the movements of the deck, a new set lever operable when shifted from normal position to effect setting of pins, a latch positioned adjacent the control member and engageable with the lever to hold said lever in normal position, means urging the latch toward the control member, means defining a notch in said control member, means connected between the control member and deck for aligning the notch with the latch when the deck descends to a "strike" detecting level to release the lever, and means on said shaft blocking movement of the latch except when the deck is in its detecting stroke.

25. In an automatic pinsetter, a pin deck for setting or resetting pins, means for moving the deck through a detecting stroke having a "strike" detecting level below the level of the deck when it finds standing pins, means for causing either the setting or resetting of pins including a movable control member, a new set lever operable when shifted from normal position to effect a setting of pins, a latch positioned adjacent the control member and engageable with the lever to hold said lever in normal position, means defining a notch in said control member, and means connected between the control member and deck for aligning the notch with the latch when the deck descends to a "strike" detecting level to release the lever.

26. An automatic pinsetter comprising, in combination, a pin deck for setting or reseting bowling pins, mechanism for operating the pin deck through a detecting stroke and new set or reset cycle, mechanical control means including a shiftable member having at least two positions for controlling said operating mechanism, and a rod between said deck and member for setting said member in a position corresponding to the lowest level of the deck in the detecting stroke.

27. An automatic pinsetter comprising, in combination, a frame, a deck, means movably supporting the deck on the frame for up and down movement, mechanism for operating the deck through a detecting stroke and new set or reset cycle, means for controlling said operating means including a member mounted on the frame and movable to positions corresponding to the level of the deck, means including a link movable by the deck and operatively connected to said member for causing movement of said member to one of said corresponding positions, and means for yieldably lowering the deck in a detecting stroke to a level beneath the tops of standing pins so that the deck positions the member in either "strike" or "no-strike" position depending upon the presence or absence of standing pins.

28. In an automatic pinsetting machine in combination, a pin deck, crank-driven means for operating the deck through a detecting stroke and a setting or resetting stroke after the rolling of each ball, a rake operable after each detecting stroke, a gear box for imparting a drive to said crank-driven means and rake, a clutch for driving said gear box, selectively operable means for holding the deck up while the crank means operates to eliminate the detecting stroke, and means for overcycling the machine after the rolling of a first ball if pins remain standing to cycle through the next detecting stroke sequence so that after the rolling of a second ball the rake will operate and the deck will then go through a setting stroke including a cam and cam follower for maintaining the clutch in engagement, and means for moving the deck holding means to operative position immediately prior to the overcycling.

29. In an automatic pinsetting machine in combinnation, a pin deck, crank-driven means for operating the deck through a detecting stroke and a setting or resetting stroke after the rolling of each ball, a rake operable after each detecting stroke, selectively operable means for holding the deck up while the crank means operates to eliminate the detecting stroke, and means for overcycling the machine after the rolling of a first ball if pins remain standing to cycle through the next detecting stroke sequence so that after the rolling of a second ball the rake will operate and the deck will then go through a setting stroke, and means for moving the deck holding means to operative position immediately prior to the overcycling.

30. An automatic pinsetter comprising, in combination, a frame, a deck, means movably mounting the deck on the frame, a rake pivotally mounted on the frame, means for moving the rake and deck through a cycle after the rolling of a ball including lowering of the rake to a guard position, descent and ascent of the deck, rearward and forward movement of the rake to sweep deadwood into the alley pit, descent and ascent of the deck and raising of the rake, and means operative when pins are left standing after a first ball in a frame to extend the machine operation into the next cycle while delaying the rake operation and preventing the first descent and ascent of the deck whereby after a second ball the initial descent of the deck is subsequent to the deadwood sweeping movement of the rake.

31. An automatic pinsetting machine comprising, in combination, a frame, a deck, means movably mounting the deck on the frame for movement toward and away from an alley bed, means for moving the deck toward and away from the alley bed twice after the rolling of a ball in a detecting stroke and a reset or setting stroke, and means for holding the deck against movement while the moving means cycles a third time when the machine is setting up for a second ball in a frame so that after the rolling of a second ball the deck will descend to set pins.

32. An automatic pinsetter comprising, in combination, a frame, a pin deck, means mounting the deck on the frame for up and down movement, cam means movable in timed relation with the deck, a pair of cam followers engageable with said cam means for controlling the setting and resetting of pins respectively, means for blocking one of the cam followers while permitting movement of the other cam follower, control means for said blocking means to block one cam follower when standing pins are to be picked up and reset and to block the other cam follower when pins are to be set on the alley bed including a detector disc shiftable to positions corresponding to levels of the deck, a mechanical connection between the deck and detector disc to cause movement of the disc in response to movement of the deck, and means for moving the deck through a detecting stroke.

33. In an automatic pinsetter having a pin deck for picking up and resetting pins and for setting pins, means including a movable cam follower for causing the setting of pins by the pin deck, means including a second movable cam follower for causing pickup and resetting of pins by the pin deck, a single cam engageable with both of said followers, means for rotating the cam to cause operation of both followers at the proper time in a machine cycle, and means for blocking one follower or the other depending upon whether the setting or resetting operation is to be performed by the pin deck.

34. An automatic pinsetter as defined in claim 33, wherein the means for blocking includes a two-position rocker arm engageable with one follower or the other, a new set lever movable between two positions, means connecting the lever to the arm for movement together whereby the arm blocks the first cam follower in one position of the lever and the arm blocks the second cam follower in the other position of the lever, and means for controlling the position of the lever including a movable control member positioned by the pin deck.

References Cited in the file of this patent

UNITED STATES PATENTS

| | | |
|---|---|---|
| 2,298,718 | Nejedly | Oct. 13, 1942 |
| 2,346,189 | Schmidt | Apr. 11, 1944 |
| 2,514,457 | Schmidt | July 11, 1950 |
| 2,525,766 | Broekhuysen | Oct. 17, 1950 |
| 2,697,605 | Montooth et al. | Dec. 21, 1954 |